US006440352B1

(12) United States Patent
Sasaki et al.

(10) Patent No.: US 6,440,352 B1
(45) Date of Patent: Aug. 27, 2002

(54) LIQUID ACCOMMODATING CONTAINER PROVIDING NEGATIVE PRESSURE, MANUFACTURING METHOD FOR THE SAME, INK JET CARTRIDGE HAVING THE CONTAINER AND INK JET RECORDING HEAD AS A UNIT, AND INK JET RECORDING APPARATUS

(75) Inventors: Toshiaki Sasaki, Abiko; Sadayuki Sugama, Tsukuba; Hideo Okada, Fuchu, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/334,676

(22) Filed: Jun. 17, 1999

Related U.S. Application Data

(62) Division of application No. 08/635,263, filed on Apr. 15, 1996, now Pat. No. 5,975,330.

(30) Foreign Application Priority Data

| | | |
|---|---|---|
| Apr. 17, 1995 | (JP) | 7-090895 |
| Jun. 8, 1995 | (JP) | 7-141947 |
| Jan. 29, 1996 | (JP) | 8-012876 |
| Apr. 8, 1996 | (JP) | 8-085251 |

(51) Int. Cl.[7] ..... B29C 49/22

(52) U.S. Cl. ..... 264/512; 264/515; 264/536; 264/540

(58) Field of Search ..... 264/512, 515, 264/536, 540; 222/105; 220/495.01, 23.91, 62.21, 666, 669; 347/87

(56) References Cited

U.S. PATENT DOCUMENTS

| | | | | | |
|---|---|---|---|---|---|
| 3,457,337 A | * | 7/1969 | Turner | 264/515 |
| 4,119,034 A | | 10/1978 | Wax | 101/366 |
| 4,422,084 A | | 12/1983 | Saito | 346/140 R |
| 4,509,062 A | | 4/1985 | Low et al. | 346/140 R |
| 4,689,642 A | | 8/1987 | Sugitani | 346/140 R |
| 4,816,093 A | | 3/1989 | Robbins | 156/69 |
| 4,940,997 A | | 7/1990 | Hamlin et al. | 346/140 R |
| 5,153,612 A | | 10/1992 | Dunn et al. | 346/140 R |
| D332,130 S | * | 12/1992 | Przytulla | D23/202 |
| 5,344,045 A | * | 9/1994 | Richter et al. | 222/1 |
| 5,407,629 A | * | 4/1995 | Schmidt et al. | 264/512 |
| 5,435,452 A | | 7/1995 | Nishigami et al. | 215/12.1 |
| 5,440,333 A | | 8/1995 | Sykora et al. | 347/87 |
| 5,447,678 A | | 9/1995 | Kneer et al. | 264/515 |
| 5,500,665 A | | 3/1996 | Ujita et al. | 347/86 |
| 5,513,761 A | * | 5/1996 | Kobayashi et al. | 222/105 |

FOREIGN PATENT DOCUMENTS

| | | | | |
|---|---|---|---|---|
| EP | 182094 | * | 10/1983 | 264/515 |
| EP | 493978 | | 7/1992 | |
| EP | 543315 | | 5/1993 | |
| EP | 604712 | | 7/1994 | |
| EP | 623444 | | 11/1994 | |
| GB | 2027415 | | 2/1980 | |
| JP | 56-67269 | | 6/1981 | |
| JP | 58-171328 | * | 10/1983 | 264/515 |

(List continued on next page.)

*Primary Examiner*—Jan H. Silbaugh
*Assistant Examiner*—Suzanne E. McDowell
(74) *Attorney, Agent, or Firm*—Fitzpatrick, Cella, Harper & Scinto

(57) ABSTRACT

A liquid container includes a substantially prism-like outer wall provided with a substantial air vent portion and having a corner formed by 3 surfaces: an inner wall having outer surfaces equivalent or similar to inside surfaces of said outer wall and a corner corresponding the corner of said outer wall, said inner wall defining a liquid accommodating portion for containing liquid therein, said inner wall further having a liquid supply portion for supplying the liquid out of said liquid accommodating portion; wherein said inner wall has a thickness which decreases from a central portion of the surfaces of the prism-like shape to the corner, and said outer wall and and said inner wall are separable from each other.

23 Claims, 23 Drawing Sheets

FOREIGN PATENT DOCUMENTS

| | | |
|---|---|---|
| JP | 61-93246 | 5/1986 |
| JP | 63-12427 | 1/1988 |
| JP | 4-267727 | 9/1992 |
| JP | 4-229759 | 11/1992 |
| JP | 5-77345 | 3/1993 |
| JP | 5-213372 | 8/1993 |
| JP | 5-213373 | 8/1993 |
| JP | 5-254144 | 10/1993 |
| JP | 6-13099 | 1/1994 |
| JP | 6-27523 | 2/1994 |
| JP | 6-211243 | 8/1994 |
| JP | 6-226993 | 8/1994 |
| TW | 219007 | 11/1994 |
| WO | WO 91/07240 | 5/1991 |
| WO | WO 92/11187 | 7/1992 |
| WO | WO 92/12926 | 8/1992 |
| WO | WO 93/02926 | 2/1993 |

* cited by examiner

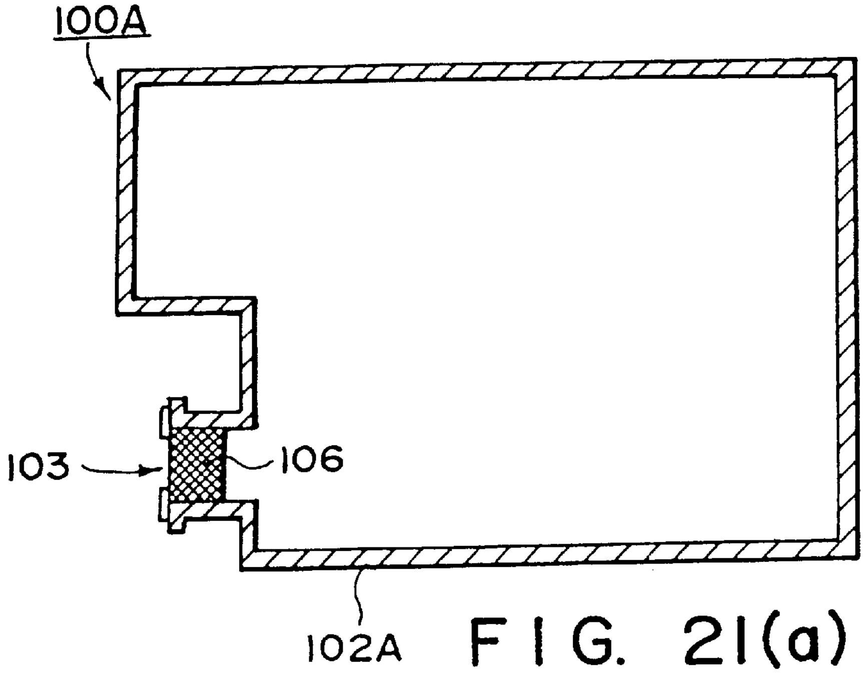
FIG. 21(a)
FIG. 21(b)
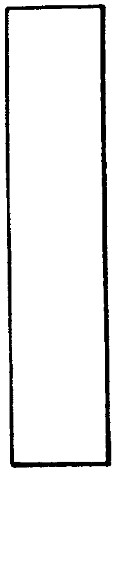
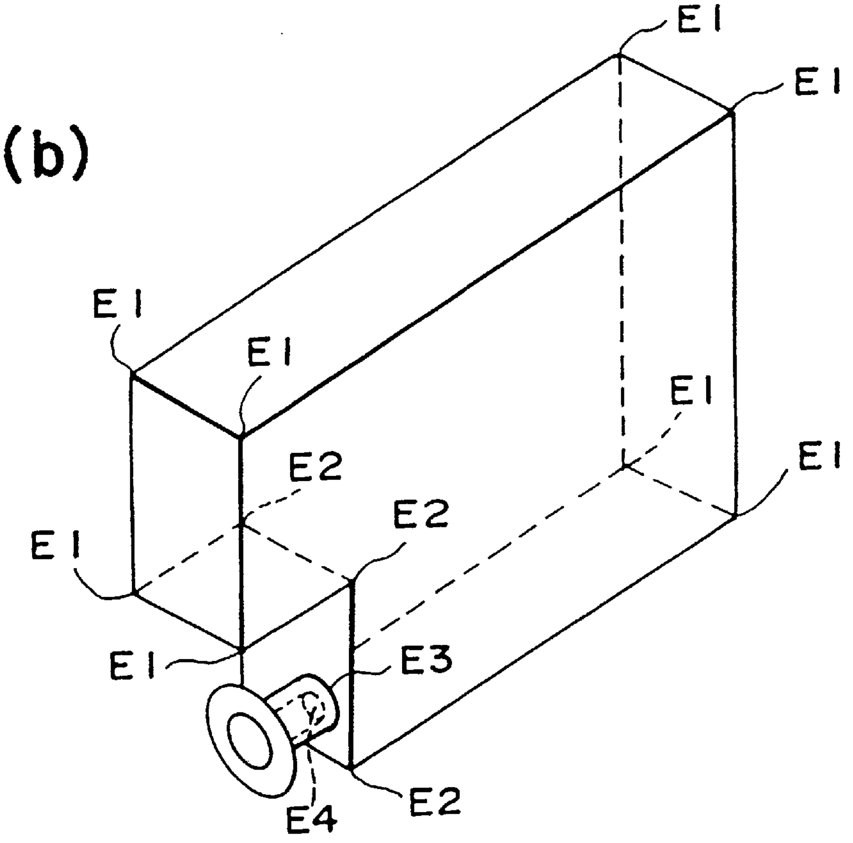
FIG. 21(c)

LIQUID ACCOMMODATING CONTAINER PROVIDING NEGATIVE PRESSURE, MANUFACTURING METHOD FOR THE SAME, INK JET CARTRIDGE HAVING THE CONTAINER AND INK JET RECORDING HEAD AS A UNIT, AND INK JET RECORDING APPARATUS

This application is a division of Application Ser. No. 08/635,263, filed Apr. 15, 1996, now U.S. Pat. No. 5,975, 330.

FIELD OF THE INVENTION AND RELATED ART

The present invention relates to a liquid accommodating container for supplying liquid out with a negative pressure to a recording station such as a pen, ink ejection portion or the like, a manufacturing method for the container, an ink jet cartridge containing the container portion and an ink jet recording head portion, and an ink jet recording apparatus, and more particularly, to use of blow molding for formation of the ink container per se in the field of ink jet recording.

A container for accommodating liquid is known wherein the liquid is supplied out of the container while maintaining a negative pressure within the container. Such a container performs appropriate liquid supply for the liquid using portion such as a nib or tip of a pen or recording head connected to the container, by the negative pressure produced by the container per se.

Various liquid accommodating containers of this type are used, but the usable ranges thereof are rather limited. One of the reasons for this is that there has not been an one easy to manufacture and having a simple structure.

For example, in the field of the ink jet recording requiring a proper negative pressure property, a container having a sponge therein as a generation source for the negative pressure or a bladder-like container having a spring providing force against an inward deformation due to the consumption of the ink, as disclosed in Japanese Laid Open Patent Application No. SHO-56-67269, Japanese Laid Open Patent Application No. HEI-6-226993, for example. U.S. Pat. No. 4,509,062 discloses an ink accommodation portion of rubber having a conical configuration with a rounded top having a smaller thickness than the other portion. The round thinner portion of the circular cone portion provides a portion which displaces and deforms earlier than the other portion. These examples have been put into practice, and are satisfactory at present.

However, the negative pressure generating mechanisms described above is relatively expensive, and therefore, does not suit for the writing devices such as markers, plotters having writing tips. The use of the complicated negative pressure generating mechanism is not desirable since it result in bulkiness of the writing device.

In writing devices, the use is made with a felt capable of generating a negative pressure and of introducing the air from the tip to permit supply of the ink thereto. The main problem of this type of the gas-liquid exchange structure for the ink supply is the ink leakage at the tip. In order to solve this problem, an ink retaining mechanism has been proposed wherein a great number of fins are formed at predetermined intervals between the tip and the liquid accommodating container extending in a direction perpendicular to the ink supply direction, for the purpose of preventing the ink leakage by retaining the ink which is going to leak upon the ambient condition change or the like. However, such a mechanism results in a relatively large amount of non-usable ink remaining in the container.

The ink supplying system of such writing devices, generally uses an open type, which leads to evaporation of the ink, with the result of reduction of the usable amount of the ink. Therefore, ink evaporation suppression by using substantial sealed type is desirable.

The description will be made briefly about the substantially sealed type in the ink jet recording. When a negative pressure generation source is not used in an ink supplying system, the ink is supplied using the level difference relative to the ink using portion(ink ejection head), that is, the static head difference. This does not require any special condition in the ink accommodation portion, and therefore, a simple ink accommodation bladder is used in many cases.

However, in order to use a closed system, the ink supply path has to extend between the ink accommodation bladder to the ink using portion(ink ejection head) thereabove with the result that a long ink supply tube is required, so that the system is bulky. In order to reduce or eliminate the static head difference of the ink supply path, an ink container capable of providing the ink ejection head with a negative pressure, has been proposed and put into practice. Here, a term “head cartridge” is used to cover an unified head and ink container.

The head cartridge is further classified into a type wherein the recording head and the ink accommodating portion are always unified, and a type wherein the recording means and the ink accommodating portion are separable, and are separately mountable to the recording device, but are unified in use.

In either structure, the connecting portion of the ink accommodating portion relative to the recording means is provided at a position lower than the center of the ink accommodating portion in order to increase the usage efficiency of ink accommodated in the ink accommodating portion. In order to stably maintain the ink and to prevent the ink leakage from the ejection portion such as a nozzle in the recording means, the ink accommodating portion in the head cartridge is given a function of generating a back pressure against the ink flow to the recording means. The back pressure is called “negative pressure”, since it provides negative pressure relative to the ambient pressure at the ejection outlet portion.

In order to produce the negative pressure, the use may be made with capillary force of a porous material or member. The ink container using the method, comprises a porous material such as a sponge contained and preferably compressed in the entirety of the ink container, and an air vent for introducing air thereinto to facilitate the ink supply during the printing.

However, when the porous material is used as an ink retaining member, the ink accommodation efficiency per unit volume is low. In order to provide a solution to this problem, the porous material is contained in only a part of the ink container rather than in the entirety of the ink container in a proposal. With such a structure, the ink accommodation efficiency and ink retaining performance per unit volume is larger than the structure having the porous material in the entirety of the ink container.

From the standpoint of improving the ink accommodation efficiency, the bladder-like container using or not using the spring, or the ink accommodating container of rubber is usable.

Such an ink container is widely used now.

However, further improvement is desired.

For example, further increase of the ink accommodation efficiency is desirable. More particularly, a larger amount of the ink is desired to be contained in the same volume of the container.

The smaller number of parts constituting the ink container and simpler container are desirable. An increase of the yield and reduction of the quality control items are desired.

SUMMARY OF THE INVENTION

Accordingly, it is a principal object of the present invention to provide a liquid accommodating container wherein the liquid can be supplied out with a stabilized negative pressure.

It is another object of the present invention to provide a negative pressure using type liquid accommodating container, a manufacturing method therefor, and a manufacturing apparatus, wherein the inside space of a container can be used to the maximum to accommodate the ink, and the variation of the quality is low.

It is a further object of the present invention to provide a negative pressure using type liquid accommodating container, manufacturing method therefor, and liquid supply method, wherein the liquid supply performance is high with a simple structure.

It is a further object of the present invention to provide a liquid supply system and a liquid accommodating container usable therewith, wherein a static head difference is used, and size is small.

It is a further object of the present invention to provide a liquid accommodating container which is particularly suitable to an ink jet head.

It is a further object of the present invention to provide a novel ink supply system.

According to an aspect of the present invention, there is provided a liquid container, comprising a substantially prism-like outer wall provided with a substantial air vent portion and having a corner formed by 3 surfaces: an inner wall having outer surfaces equivalent or similar to inside surfaces of said outer wall and a corner corresponding the corner of said outer wall, said inner wall defining a liquid accommodating portion for containing liquid therein, said inner wall further having a liquid supply portion for supplying the liquid out of said liquid accommodating portion; wherein said inner wall has a thickness which decreases from a central portion of the surfaces of the prism-like shape to the corner, and said outer wall and and said inner wall are separable from each other.

According to another aspect of the present invention, there is provided a liquid container, comprising a substantially prism-like outer wall provided with a substantial air vent portion and having a corner formed by 3 surfaces: an inner wall having outer surfaces equivalent or similar to inside surfaces of said outer wall and a corner corresponding the corner of said outer wall, said inner wall defining a liquid accommodating portion for containing liquid therein, said inner wall further having a liquid supply portion for supplying the liquid out of said liquid accommodating portion; wherein each of surfaces of said outer wall is inwardly convex, and wherein said outer wall has a thickness which decreases from a central portion of the surfaces of the prism-like shape to the corner, and said outer wall and and said inner wall are separable from each other.

According to a further aspect of the present invention, there is provided a liquid container, comprising a substantially liquid accommodating member having a corner formed by 3 surfaces: a corner enclosing member for constraining movement of the corner of said liquid accommodating member while permitting movement thereof without substantial deformation of the corner, said corner enclosing member can maintain its shape against deformation of said liquid accommodating member; a liquid supply port for supplying the liquid out of said liquid accommodating member; wherein said liquid supply member has a thickness which is smaller at the corner than that at a central portion of the surfaces of the prism-like shape.

According to a further aspect of the present invention, there is provided a manufacturing method for a liquid accommodating container, said method comprising providing a liquid container, comprising a substantially prism-like outer wall provided with a substantial air vent portion and having a corner formed by 3 surfaces: an inner wall having outer surfaces equivalent or similar to inside surfaces of said outer wall and a corner corresponding the corner of said outer wall, said inner wall defining a liquid accommodating portion for containing liquid therein, said inner wall further having a liquid supply portion for supplying the liquid out of said liquid accommodating portion; wherein said inner wall has a thickness which decreases from a central portion of the surfaces of the prism-like shape to the corner, and said outer wall and and said inner wall are separable from each other; reducing pressure of the liquid accommodating portion to separate the inner wall and the outer wall from each other; and supplying the liquid into the liquid accommodating portion.

According to a further aspect of the present invention, there is provided an ink jet cartridge, comprising: an ink jet head for ejecting ink; an ink container, connected with said ink jet head, for supplying ink to said ink jet head; wherein said ink container, comprising: a substantially prism-like outer wall provided with a substantial air vent portion and having a corner formed by 3 surfaces: an inner wall having outer surfaces equivalent or similar to inside surfaces of said outer wall and a corner corresponding the corner of said outer wall, said inner wall defining an ink accommodating portion for containing ink therein, said inner wall further having an ink supply portion for supplying the ink out of said ink accommodating portion; a pinch-off portion in a side other than a maximum area side, wherein in the pinch-off portion, said inner wall is sandwiched by said outer wall; wherein said inner wall has a thickness which decreases from a central portion of the surfaces of the prism-like shape to the corner, and said pinch-off portion is provided in each of opposing sides: wherein said is provided in said inner wall and said said, in sides other than maximum area sides of said inner wall and outer wall.

In the foregoing, the recording station requires negative pressure of the ink, an in recording pen or ink ejection outlet.

The following defines further preferable conditions.

A container wherein a thickness of said inner wall gradually decreases to the corner from central portions of the surfaces thereof.

A container wherein the thickness of said inner wall is not less than 100 $\mu$m and not more than 400 $\mu$m at central portions of the surfaces thereof, and the thickness thereof is not less than 20 $\mu$m and not more than 200 $\mu$m at the corner.

A container wherein the corners of said inner wall and said outer wall are curved.

A container wherein a ratio of a longest edge and a shortest edge of a minimum rectangular parallelopiped enclosing the liquid accommodating container is 2:1 to 10:1.

The present invention is particularly usable for an ink container, head cartridge and recording apparatus using ink jet recording system.

According to a further aspect of the present invention, there is provided an ink container, comprising: a substantially prism-like outer wall provided with a substantial air vent portion and having a corner formed by 3 surfaces: an inner wall having outer surfaces equivalent or similar to inside surfaces of said outer wall and a corner corresponding the corner of said outer wall, said inner wall defining an ink accommodating portion for containing ink therein, said inner wall further having an ink supply portion for supplying the ink out of said ink accommodating portion; a pinch-off portion in a side other than a maximum area side, wherein in the pinch-off portion, said inner wall is sandwiched by said outer wall; wherein said inner wall has a thickness which decreases from a central portion of the surfaces of the prism-like shape to the corner, and said pinch-off portion is provided in each of opposing sides: wherein said is provided in said inner wall and said said, in sides other than maximum area sides of said inner wall and outer wall.

According to a further aspect of the present invention, there is provided a manufacturing method for a liquid container, wherein said liquid container including: an outer wall; an inner wall having an outer surface equivalent to inside surfacer of the outer wall and having a liquid accommodating portion capable of containing liquid therein, and liquid supply portion for supplying the liquid out of the liquid accommodating portion; wherein said liquid accommodating container has a polygonal cross-section, said method comprising the steps of: providing a mold corresponding to an outer shape of the liquid accommodating container; providing a substantially cylindrical shaped first parison for the outer wall, said first parison having a diameter smaller than that of the mold; providing substantially cylindrical shaped second parison for the inner wall; expanding the first and second parisons by injecting air so that the first parison extends along the mold, so that the inner wall and the outer wall are separable from each other, and a space defined by the inner wall and a space defined by the outer wall are similar in configuration to each other.

According to a further aspect of the present invention, there is provided a manufacturing method for a liquid accommodating container, said method comprising: providing a liquid-container, comprising: a substantially prism-like outer wall provided with a substantial air vent portion and having a corner formed by 3 surfaces: an inner wall having outer surfaces equivalent or similar to inside surfaces of said outer wall and a corner corresponding the corner of said outer wall, said inner wall defining a liquid accommodating portion for containing liquid therein, said inner wall further having a liquid supply portion for supplying the liquid out of said liquid accommodating portion; wherein said inner wall has a thickness which decreases from a central portion of the surfaces of the prism-like shape to the corner, and said outer wall and and said inner wall are separable from each other; reducing pressure of the liquid accommodating portion to separate the inner wall and the outer wall from each other; and supplying the liquid into the liquid accommodating portion.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1(*b*) is a side view thereof.

FIG. 1(*c*) is a perspective view thereof.

FIGS. 2(*a*2), (*b*2), (*c*2), and (*d*2) is a side view thereof.

FIG. 3(*b*) is a side view thereof.

FIG. 4(*b*) is a side view thereof.

FIG. 9(*b*) is a top plan view thereof.

FIG. 9(*c*) is a perspective view thereof when the bottom portion takes a top position.

FIG. 11(*b*) is a side view thereof.

FIG. 15(*b*) is a substantially sectional view of connection state between the recording head and ink container.

FIG. 18(*b*) is a side view thereof.

FIG. 19(*b*) is a side view thereof.

FIG. 21(*a*) is a schematic sectional view of an ink container according to a fourth embodiment of the present invention.

FIG. 21(*b*) is a side view thereof.

FIG. 21(*c*) is a perspective view thereof.

DETAILED DESCRIPTION OF THE PREFERRED EMBODIMENTS

Referring to the accompanying drawings, the embodiments of the present invention will be described.

Figure 1A:
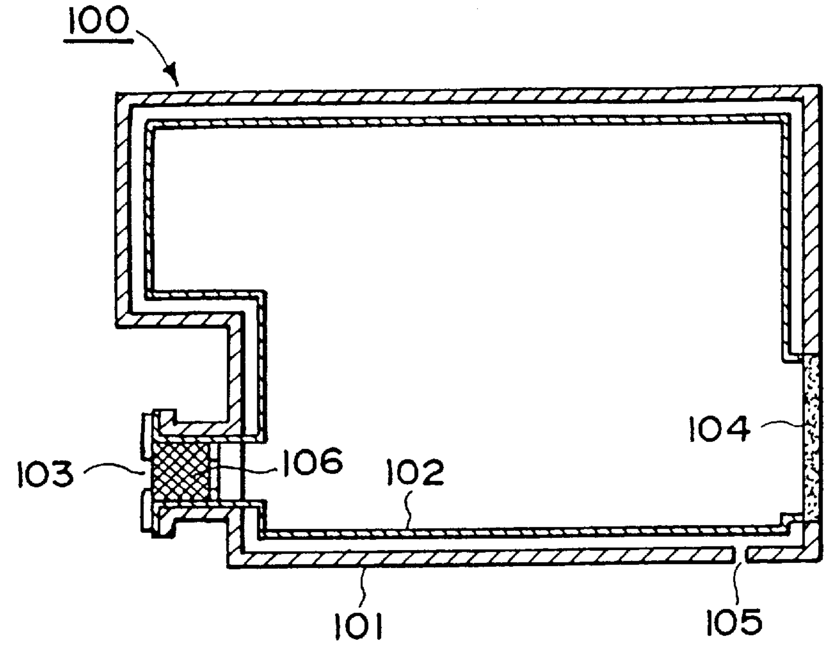
FIG. 1(*a*) is a schematic sectional view of an ink container according to a first embodiment of the present invention.
Figure 1B:
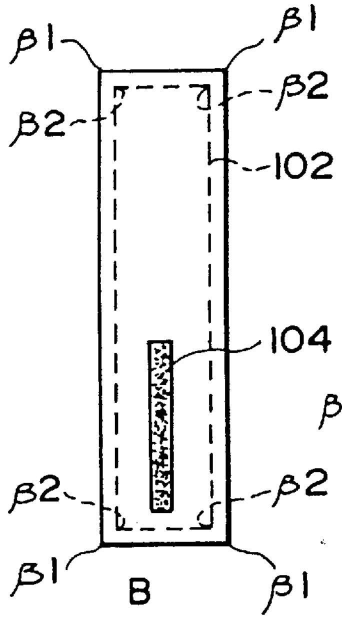
Figure 1C:
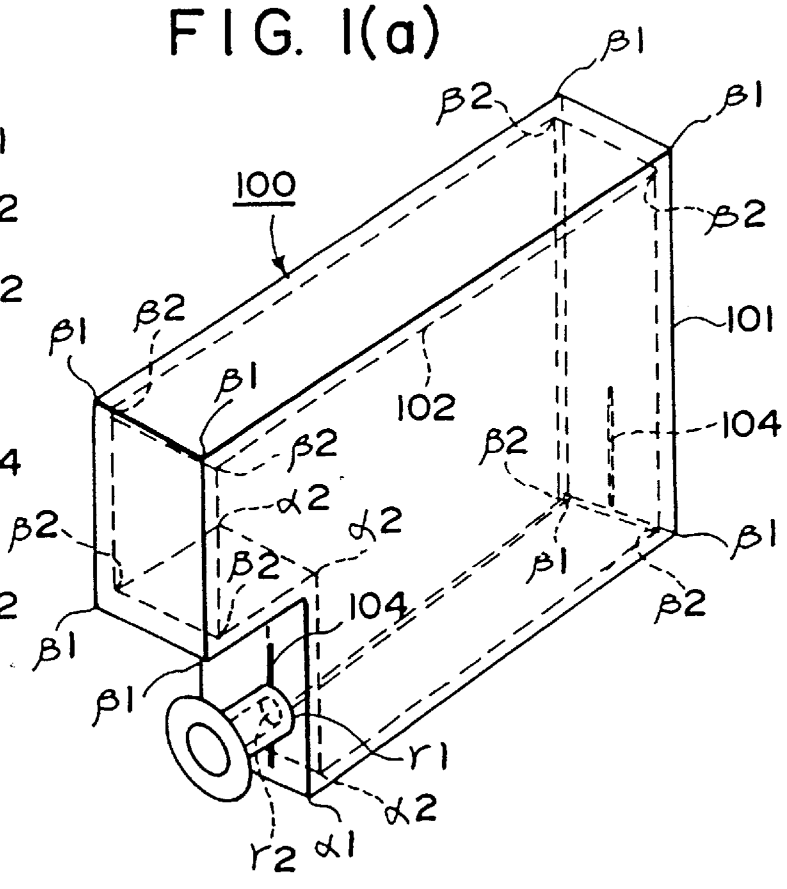
Figure 2:
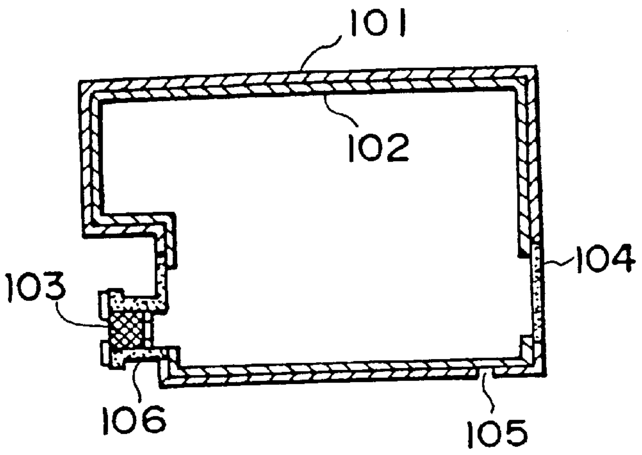
FIGS. 2(*a*1), (*b*1), (*c*1), and (*d*1) is a sectional view of a container illustrating deformation thereof with ink discharge, according to a first embodiment of the present invention.
Figure 2:
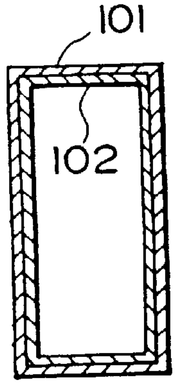
Figure 2:
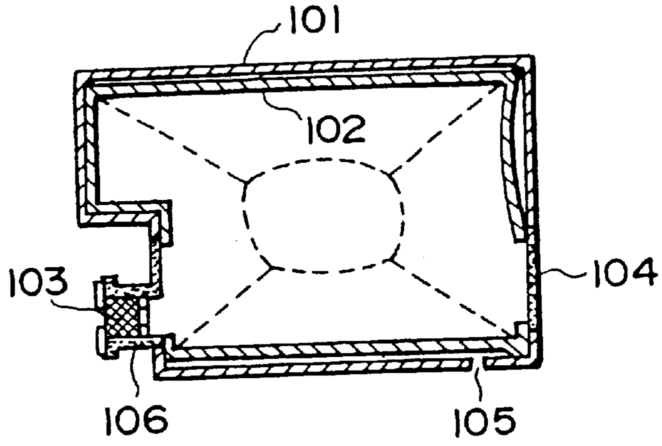
Figure 2:
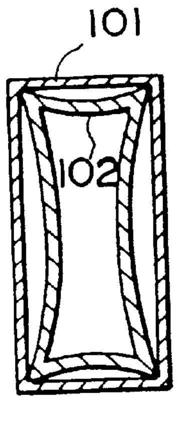
Figure 2:
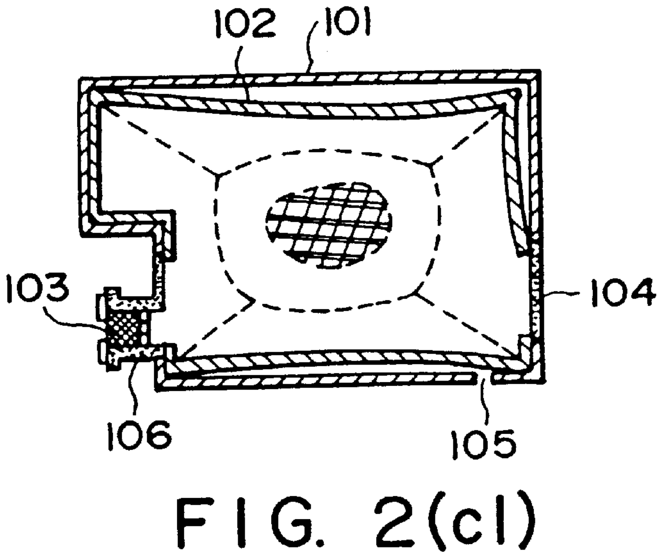
Figure 2:
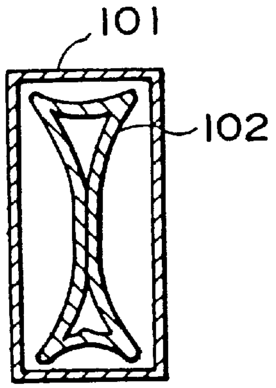
Figure 2:
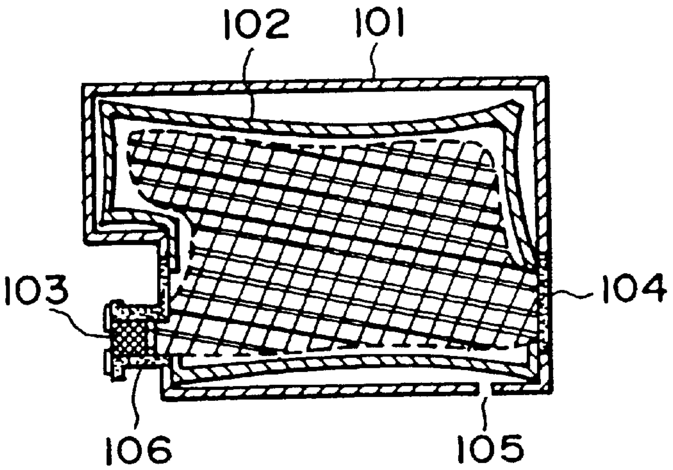
Figure 2:
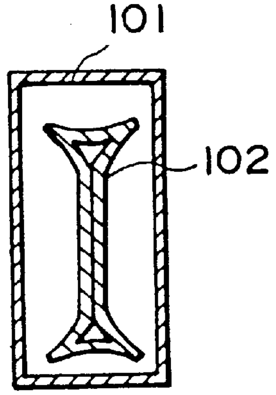
Figure 5:
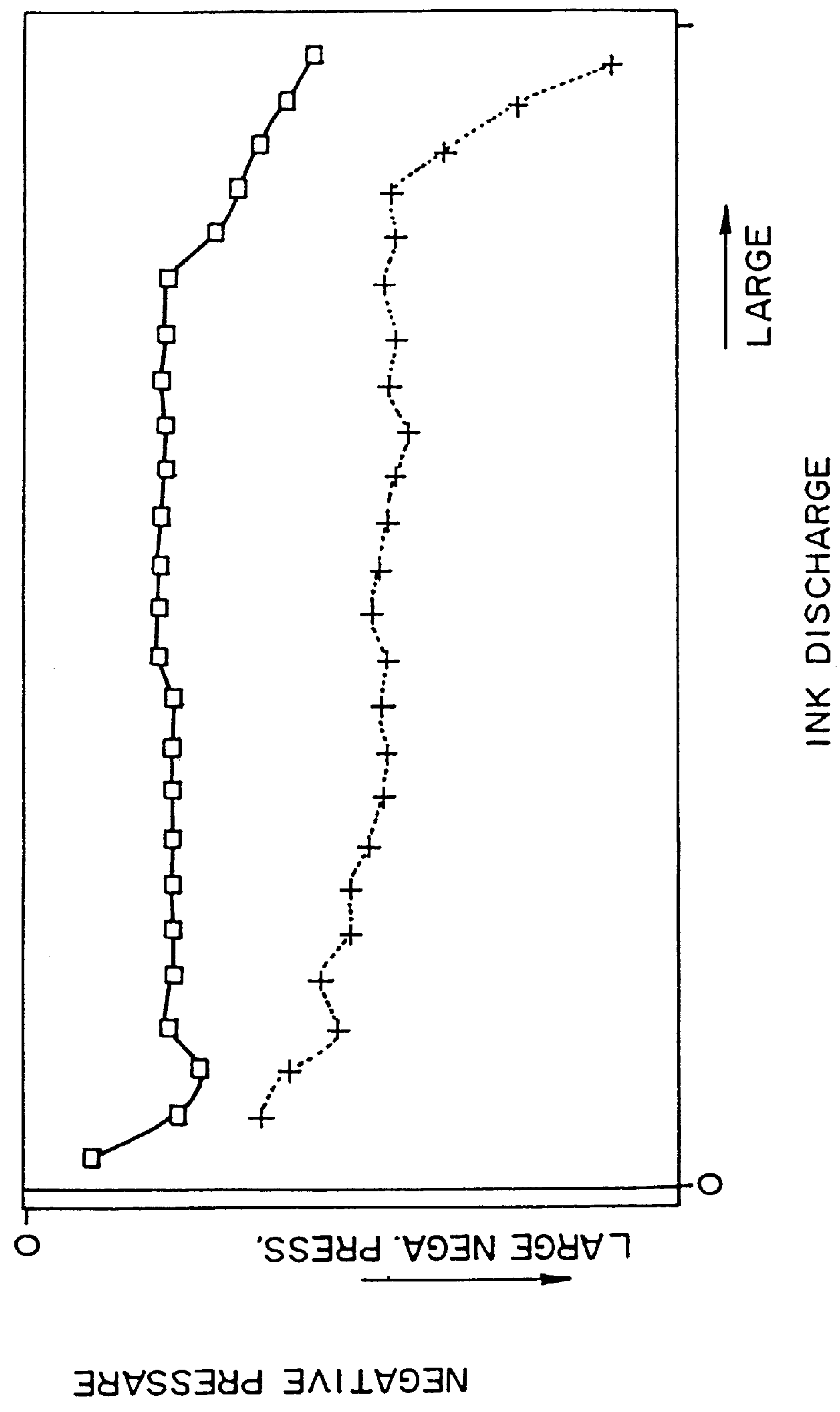
FIG. 5 is a schematic illustration of a negative pressure property of an ink container of the present invention.
Figure 6A:
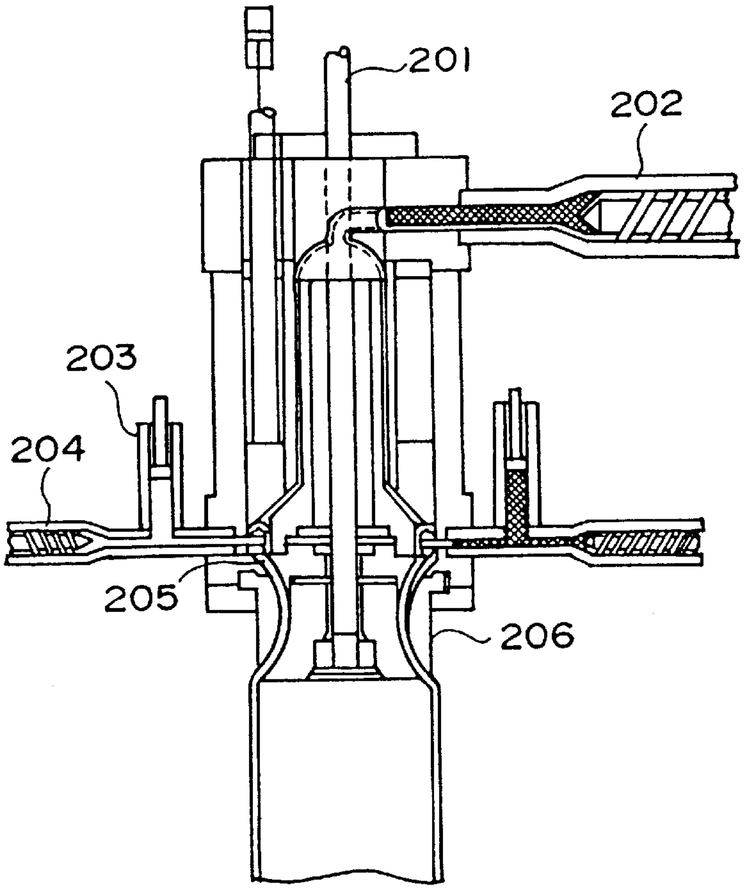
FIGS. 6(*a*)–(*d*) are an illustration of a manufacturing step for the ink container, according to a first embodiment of the present invention.
Figure 6B:
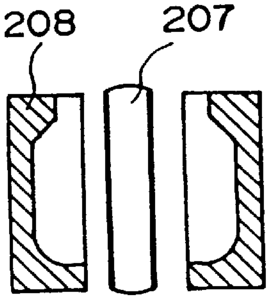
Figure 6C:
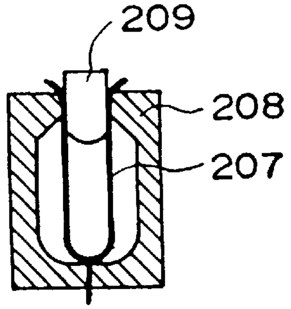
Figure 6D:
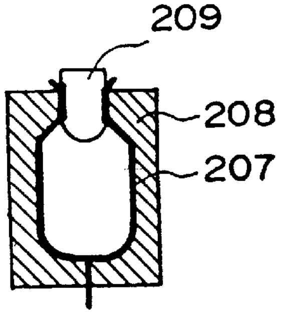

Referring to FIGS. 1, 2 and FIG. 5, the description will first be made as to the stabilized negative pressure generation and as to the mechanism for the ink retaining, before the description of the embodiments.

FIGS. 1(*a*)–(*c*), are schematic views of a structure of an ink container according to an an embodiment of the present invention, wherein (*a*) is a sectional view (*b*) is a side view, and (*c*) is a perspective view. FIG. 1(*a*) is a sectional view taken along a plane parallel with a maximum area side of the container, as shown in FIG. 1(*c*). FIG. 2 is an illustration of the ink container when the ink therein is consumed, wherein FIGS. 2(*a*1)–(*d*1) are sectional views taken along a line B—B of FIG. 1(*b*), and FIGS. 2(*a*2)–(*d*2) are sectional views taken along a line A—A of FIG. 1(*a*). The ink container of this embodiment has an inner wall (inner shell) and an outer wall (outer casing, housing or frame) and a separation layer, and the ink container has been manufactured through a single process using a direct blow molding as will be described hereinafter.

The ink container 100 of FIG. 1 has the inner wall 102 separable from the outer wall 101 constituting an outer casing or housing, and the ink can be accommodated in the space defined by the inner wall 102 (ink accommodating portion). The thickness of the outer wall 101 is sufficiently larger than that of the inner wall 102 so that the outer wall 101 hardly deforms despite the deformation of the inner wall 102 due to the discharging of the ink to the outside. The outer wall is provided with an air vent 105 for permission of air introduction. The inner wall has a welded portion(pinch-off portion) 104 where the inner wall is supported by the outer wall.

The ink container 100 of FIG. 1 is constituted by 8 flat surfaces, and by an additional cylindrical ink supplying portion 103. The maximum area surfaces of the inner and outer walls at the respective sides of the ink supplying portion 103 have 6 corners (α1, β1, β1, β1, β1 and α1), and (α2, β2, β2, β2, β2 and α2), respectively, as will be described in detail hereinafter.

The thickness of the inner wall is smaller in the corner portions than in the central portions of the surfaces or sides constituting the substantially prism-like (more particularly, rectangular parallelopiped) configuration, more particularly, the thickness gradually decreases from the central portions of each side surface to the associated corners, and therefore, the respective surfaces are convex toward the inside of the ink accommodating portion. The convex configuration is along the direction of deformation of the surface occurring with the consumption of the ink. The convex shape promotes the deformation of the ink accommodating portion.

The corner of the inner wall is provided by 3 surfaces, which will be described hereinafter, so that the strength of the corner as a whole is relatively high as compared with the strength of the central portion of the surfaces. However, the surfaces at and adjacent each corner has a thickness smaller than the center portions of the surfaces providing the corner, thus permitting easy movement of the surfaces, as will be described hereinafter. It is desirable that the portions constituting the inner wall corner have substantially the same thicknesses.

The ink supplying portion 103 is connected with an ink discharge tube of an ink jet recording means through an ink discharge permission member 106 having an ink leakage preventing function for preventing the leakage of the ink upon small vibration or external pressure imparted thereto (initial state). The ink supplying portion 103, the inner wall and the outer wall are not easily separated from each other by the ink discharge permission member 106 and so on. Crossing portions γ1 and γ2 between the flat surface and a curved surface of the cylindrical configuration, do not easily collapse against the deformation of the inner wall resulting from the consumption of the ink by normal ejections of the ink through the ink jet recording means. The configuration of the ink supplying portion is not limited to the cylindrical shape. It may be a polygonal prism shape (polygonal column). Even in this case, the size of the ink supplying portion is sufficiently smaller than the ink accommodating portion, and therefore, it does not easily collapse against the deformation of the inner wall resulting from the consumption of the ink. Therefore, even at the end of the consumption of the ink, the outer wall and the inner wall are not deformed but has the same configuration as the initial stage, at the ink supplying portion.

In FIGS. 1 and 2, the outer wall 101 and the inner wall 102 of the ink container are separated with a relatively large clearance therebetween, but it is not inevitable, and the clearance may be so small that they may be substantially contacted, or it will suffice if they are separable. Therefore, in the initial state, the corners α2 and β2 of the inner wall 102 are at the inner side of the corners α1 and corners α2 of the outer wall 101 (FIGS. 2(*a*1) and (*a*2)).

Here, the corner means a crossing portion of at least 3 surfaces of polyhedron constituting the ink container, and a portion corresponding to a crossing portion of extended surfaces thereof. The reference characters designating the corners are such that α means corners formed by the surfaces having the ink supply port, and β means the other corners; and suffix 1 is for the outer wall, and suffix 2 is for the inner wall. The crossing portions between the substantial flat surface and the curved surface of the cylindrical ink supplying portion is designated by γ; and the outer wall and inner wall are formed at the crossing portions, too, which are designated by γ1 and γ2. The corner may be rounded in a small range. In such a case, the round portions are deemed as corners, and the other surface portions are deemed as side surfaces.

The ink of the ink accommodating portion is supplied out in response to the ejections of the ink through the ink jet recording head of the ink jet recording means, in accordance with which the inner wall starts to deform in a direction of reducing the volume of the ink accommodating portion, first at the central portion of the maximum area surface. The outer wall functions to constrain the displacement of the corners of the inner wall. In this embodiment, the corner α2 and the β2 are hardly moved, so that the corners are effective to be against the deformation caused by the ink consumption, and therefore, a stabilized negative pressure is produced.

The air is introduced through the air vent 105 into between the inner wall 102 and the outer wall 101, and the surfaces of the inner wall can be deformed smoothly, thus permitting the negative pressure to be stably maintained. The space between the inner wall and the outer wall is in fluid communication with the ambience through the air vent. Then, the force provided by the inner wall and the meniscus force at the ejection outlet of the recording head balance so that the ink is retained (FIGS. 2(*b*1) and (*b*2)).

When quite a large amount of the ink is discharged from the ink accommodating portion (FIGS. 2(*c*1) and (*c*2)), the ink accommodating portion is deformed, more particularly, the central portions of the ink accommodating portion smoothly deforms inwardly, as described hereinbefore. The welded portions 104 function to constrain the deformation of the inner wall. Therefore, as for the sides adjacent to the maximum area sides, the portions not having the pinch-off portion start to deform so as to become away from the outer wall earlier than the portions having the pinch-off portion 104.

However, only with these inner wall deformation constraining portions described above, the deformation of the inner wall adjacent to the ink supplying portion may close the ink supplying portion before the ink contained in the ink accommodating portion is used up to sufficient extent.

According to this embodiment, however, the corner $\alpha 2$ of the inner wall shown in FIG. 1(*c*), is adjacent along the corner $\alpha 1$ of the outer wall in the initial state, and therefore, when the inner wall is deformed, the corner $\alpha 2$ of the inner wall is less easily deformed than the other portion of the inner wall, so that the deformation of the inner wall is effectively constrained. In this embodiment, the angles of the corners are 90 degrees.

Here, the angle of the corner $\alpha 2$ of the inner wall is defined as the corner $\alpha 1$ between two substantially flat surfaces of the at least 3 surfaces of the outer wall, namely, as the portion of the crossing portion of the extensions of the 2 surfaces. The angle of the corner of the inner wall is defined as the angle of the corner of the outer wall, because in the manufacturing step which will be described hereinafter, the container is manufactured on the basis of the outer wall and because the inner wall and outer wall are similar in configuration in the initial state.

Thus, as will be understood from FIGS. 2(*c*1) and (*c*2), the corner $\alpha 2$ of the inner wall shown in FIG. 1(*c*) is provided separably from the corresponding corner $\alpha 1$ oft outer wall, and on the other hand, the corner $\beta 2$ of the inner wall other than the corner formed by the surfaces having the ink supply port, is slightly separated from the corner $\beta 1$ of the correspondence outer wall as compared with the corner $\alpha 2$. However, in the embodiment of FIGS. 1 and 2, the angle $\beta$ at the opposite position is generally not more than 90 degrees. Therefore, the positional relation relative to the outer wall can be maintained close to the initial state as compared with the other parts of the inner wall constituting the ink accommodating portion, so as to provide an auxiliary support for the inner wall.

Furthermore, in FIGS. 2(*c*1) and (*c*2), the opposite maximum surface area sides are substantially simultaneously deformed, and therefore, the center portions thereof are brought into contact with each other. The contact portion of the center portions (FIGS. 2(*c*1) and (*d*1), hatched portion) expands with further ink discharge. In other words, in the ink container of this embodiment, the opposite maximum area sides of the container start to contact before the edge formed between the maximum area side and the side adjacent to thereto, collapses, with the consumption of the ink.

FIGS. 2(*d*1) and (*d*2) show the state in which substantially the entirety of the ink is used up from the ink accommodating portion (final state).

In this state, the contact portion of the ink accommodating portion, expands substantially over the entirety of the ink accommodating portion, and one or some of the corners $\beta 2$ of the inner wall are completely separated from the corresponding corners $\beta 1$ of the outer wall. On the other hand, the corner $\alpha 2$ of the inner wall is still separably positioned closely to the corresponding corner $\alpha 1$ of the outer wall even in the final state, so that the corner $\alpha 2$ functions to constrain the deformation to the end.

Before this state is reached, the welded portion 104 may have been separated from the outer wall, depending on the thickness of the inner wall. Even in that case, the length of the welded portion 104 is maintained, and therefore, the direction of the deformation is limited. Therefore, even if the welded portion is separated from the outer wall, the deformation is not irregular but it occurs with the balance properly maintained.

As described in the foregoing, the deformation starts at the maximum area sides, which then are brought into surface contact with each other before an edge of the maximum area sides are collapsed, and the contact area increases. The corners other than the corners constituted by the side having the ink supplying portion are permitted to move. Thus, the order of precedence of deforming portions of the ink accommodating portion is provided by the structure thereof.

At least one of the maximum area sides of the substantially flat sides of the outer wall of the ink container having a substantially prism configuration, is not fixed to the inner wall. This will be described in detail.

When the amount of the ink in the ink accommodating portion reduces by the ejection of the ink from the ink jet recording head, the inner wall of the ink container tends to deform at the portion which is easiest to deform under the constraint described above. Since at least one of the substantially flat maximum surface area sides of the polyhedron shape, is not fixed to the inner wall, the deformation starts at substantially the central portion of the internal wall surface corresponding to this side.

Since the side at which the deformation starts, is flat, it smoothly and continuously deforms toward the side opposite therefrom corresponding to the decrease amount of the ink in the ink accommodating portion. Therefore, during the repeated ejection and non-ejection, the ink accommodating portion does not deform substantially non-continuously, so that a further stabilized negative pressure can be maintained, which is desirable for the ink ejection of the ink jet recording apparatus.

In this embodiment, the maximum surface area sides are opposed to each other and are not fixed to the outer wall and therefore are easily separable from the outer wall thereat, and therefore, the two opposite sides deform substantially simultaneously toward each other, so that the maintaining of the negative pressure and the stabilization of the negative pressure during the ink ejections can be further improved.

Figure 17:
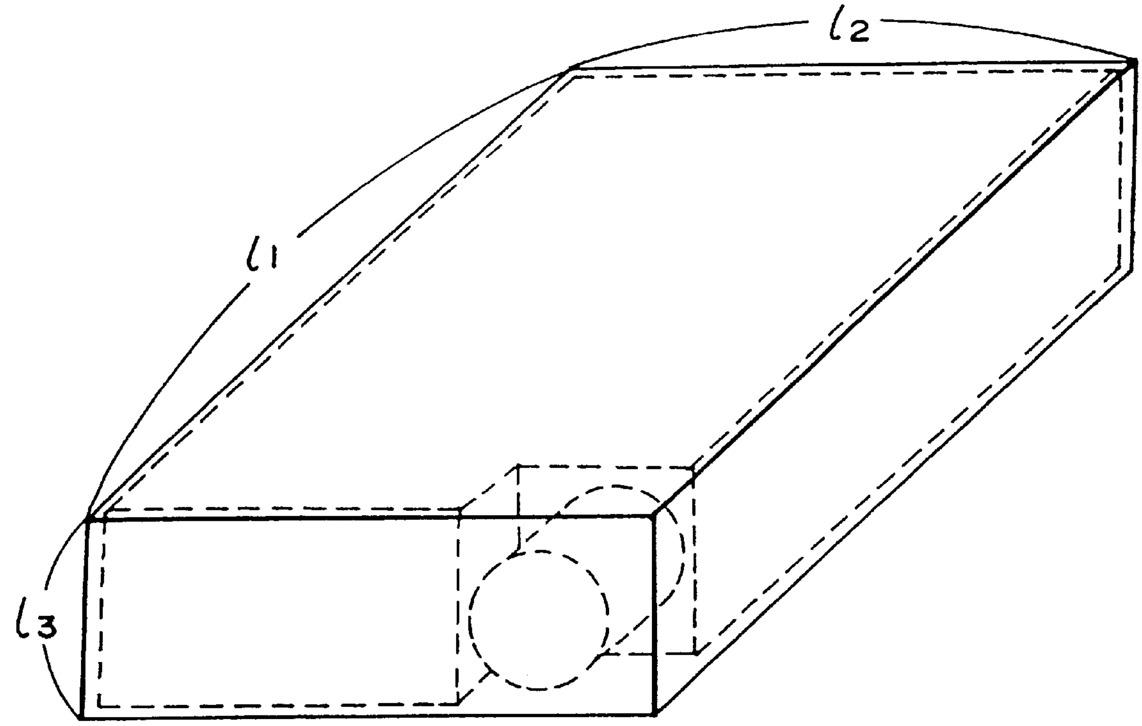
FIG. 17 is a schematic illustration of dimensions of the ink container.

The volume of the ink container for the ink jet in this embodiment is usually approx. 5–100 $cm^3$, and is 500 $cm^3$ at a typical maximum A ratio of size of the maximum surface area side to the other sides of the ink container can be determined in the following manner. As shown in FIG. 17, first, a rectangular parallelopiped of minimum size capable of containing therein the ink container is taken. The edges of the rectangular parallelopiped are designated by 11, 12 and 13 (length of edge 11 is not less than that of the edge 12, which is larger than that of the edge 13). It is desirable that the ratio of the lengths of the edges 11 and 13 is approx. 10:1–approx. 2:1. By this, when the ink container has a substantially rectangular parallelopiped configuration, the size of the maximum surface area side can be determined relative to the all surface area. In this embodiment, the area of the maximum area surface is larger than the total sum of the areas of the surfaces adjacent thereto.

The experiments have been carried out with a liquid container having a thickness of approx. 100 μm at the central portion of the inner wall, and having a thickness of several μm–10 μm adjacent to the corner. In this case, the corner is provided by a crossing portion of the 3 surfaces, the strength of the corner substantially corresponds to that of the tripled thickness namely 10×3=30 μm approx.

In the initial stage of the start of the liquid discharge, the desired negative pressure can be produced by the constraint of the collapse of the corners and the crossing portions between the surfaces or sides.

With the further discharge of the liquid, the deformation occurs and increases at the center portions of the maximum area sides of the container. Then, the corners of the sides of the inner wall begin to become away from the corresponding corners of the outer wall. Immediately after the separation of the corners, the original configuration of the corners tend to be maintained so that the deformation of the corners is constrained. However, with further liquid discharge, the configuration of the corners are gradually deformed since the thickness is as small as 100 μm.

However, all of the corner constituting the liquid container are not simultaneously separated and deformed, but they occur in the predetermined precedence order.

The precedence order is determined by the configuration of the liquid container, corner conditions such as film thickness, the position of the pinch-off portion where the inner wall is welded and is sandwiched by the outer wall, or the like. By the provision of the pinch-off portion at the positions as in this embodiment, the deformation of the inner wall and the separation thereof from the outer wall can be regulated at the positions, so that irregular deformation of the inner wall can be prevented. Additionally, the provision of the pinch-off portions at opposite positions as in this embodiment, the negative pressure can be further stabilized.

By the subsequent separation of the corners constituting the liquid container, the predetermined negative pressure can be produced stably from the initial stage of the liquid discharge to the end thereof. With the thickness of the inner wall abut 100 μm as in this embodiment, the crossing portion between the adjacent surfaces and the corners are irregularly deformed namely toward the ink supplying portion, at the time when the ink is used up.

The similar experiments were carried-out with a liquid container having a thickness of 100–400 μm at the central portions of the inner wall and a thickness of 20–200 μm adjacent to the corners, wherein the strength of the corners were quite higher than in the foregoing sample of the container.

With this container, the predetermined negative pressure were produced at the initial stage of the liquid discharge, similarly to the foregoing example. With the further consumption of the ink, the inner wall begin to gradually separate from the outer wall at the central portion of the sides. Corresponding to the deformation, the corners begin to separate from the corresponding corners of the outer wall. The deformation of the corners is small even after quite a large amount of the liquid is discharged. Since the corner is separated from the outer wall with the initial configuration is substantially maintained, the negative pressure is stabilized. At the end of the consumption of the ink, the configuration is stabilized, so that the negative pressure is provided stably to the end of use of the ink with the minimum remaining amount of the ink.

As a result of additional experiments, it has been found that the stabilized negative pressure can be generated when the thickness adjacent to the central portion of the inner wall is 100–250 μm, and the thickness adjacent to the corner is 20–80 μm.

Similar investigation were made as to a simply cylindrical container. Here, the cylindrical configuration means a cylindrical container having a height larger than the diameter thereof.

With such a cylindrical container, the strength of the side is so high because of the curved surface thereof, that the container does not collapse when it is used for the ink jet recording. The high strength structure provided by the curved surface withstand the inside pressure reduction. Therefore, the internal negative pressure tends to be too large.

When the inside liquid is forcedly sucked out, the curved side suddenly collapses, and simultaneously, a part of of the end surface is significantly buckled. It is very difficult to produce stabilized negative pressure with the use of the cylindrical configuration, and therefore, it does not suit for the ink jet recording.

FIG. 5 shows a relation between the ink use amount of the ink accommodating portion and the negative pressure of the ink container in the ink container according to this embodiment. In FIG. 5, the abscissa represents the ink discharge amount, and the ordinate represents the negative pressure. In this Figure, the negative static pressure is plotted with square marks. A total negative pressure which is a sum of the negative static pressure and the dynamic negative pressure produced when the ink flows, is plotted by "+" marks.

Here, the negative pressure in the ink accommodating portion is preferably as follows.

1. First, the negative static pressure at the time of shipment of the ink containers to the market is approx.+2 to 60 mmAq. approx. relative to the ambient pressure, and desirably, −2 to 30 mmAq. approx. If the pressure is positive at the delivery, a proper negative pressure can be provided by an initial refreshing operation in the main assembly of the recording device, for example. Here, "the state at the time of delivery" is not limited to the initial state shown in FIGS. 2(*a*1) and (*a*2).If the negative pressure is maintained, the container may contain an amount of the ink which is slightly smaller than the maximum accommodatable amount of the ink accommodating portion.

Secondly, the pressure difference between when the recording is effected and when it is not effected, is small, namely, the difference between the negative static pressure and the total pressure is small. This is accomplished by reducing the dynamic pressure. The dynamic pressure in the ink accommodating portion per se can be neglected as contrasted to the ink accommodating portion using a porous material, and therefore, the small-dynamic pressure can be easily accomplished.

Thirdly, the change in the negative static pressure due to the change of the ink amount in the ink accommodating portion is small from the initial state to the final state. In a simple structure of the ink accommodating portion, the negative static pressure changes linearly or non-linearly relative to the ink amount existing in the ink accommodating portion, and therefore, the change ratio of the static pressure is large. However, in the ink container of this embodiment, the change of the negative static pressure is small from the initial stage to immediately before final state, so that substantially stabilized negative static pressure is accomplished.

In the ink container of the first embodiment, the ink supply performance of the ink container was evaluated. The maximum thickness of the outer wall was 1 mm; the maximum thickness of the inner wall was 100 μm; and the surface area of the inner wall was 100 $cm^2$. The outer wall was of Noryl resin material, and the inner wall was of polypropylene resin material. The properties were similar to the container of FIG. 5, and the total pressure was maintained at approx.−100 mmAq. Therefore, the ink container of this embodiment is satisfactory in the field of the ink jet recording wherein the stabilized negative pressure production is necessary. Since the volume usage efficiency is high, it is particularly suitable for a small ink jet recording apparatus.

The description will be made as to 6 embodiments of the present invention including the manufacturing method. However, the present invention is not limited to these embodiment.

Embodiment 1

FIGS. 1(*a*) and (*b*) show schematic views of the ink container of first embodiment, wherein (*a*) is a sectional view (*b*) is a side view, and (*c*) is a perspective view.

Figure 3A:
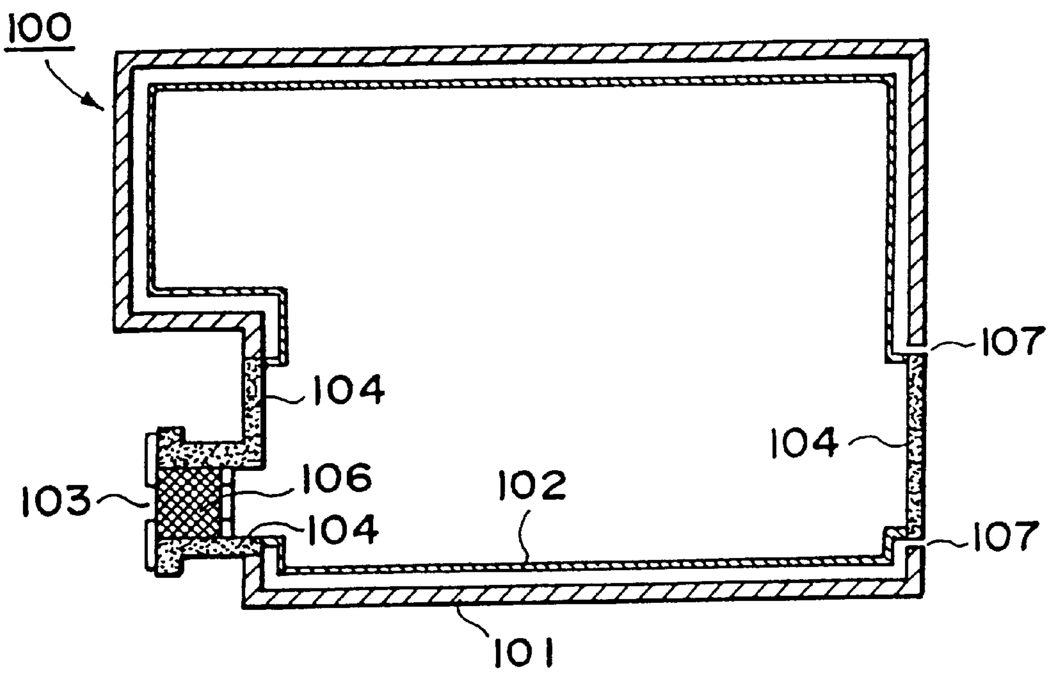
FIG. 3(*a*) is a sectional view of another example of the container of the first embodiment.
Figure 3B:
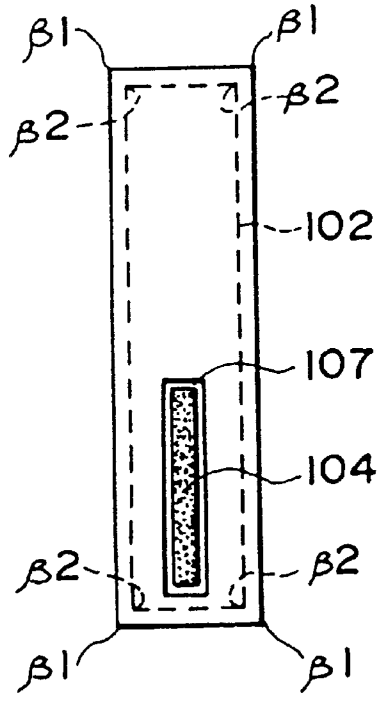
Figure 4A:
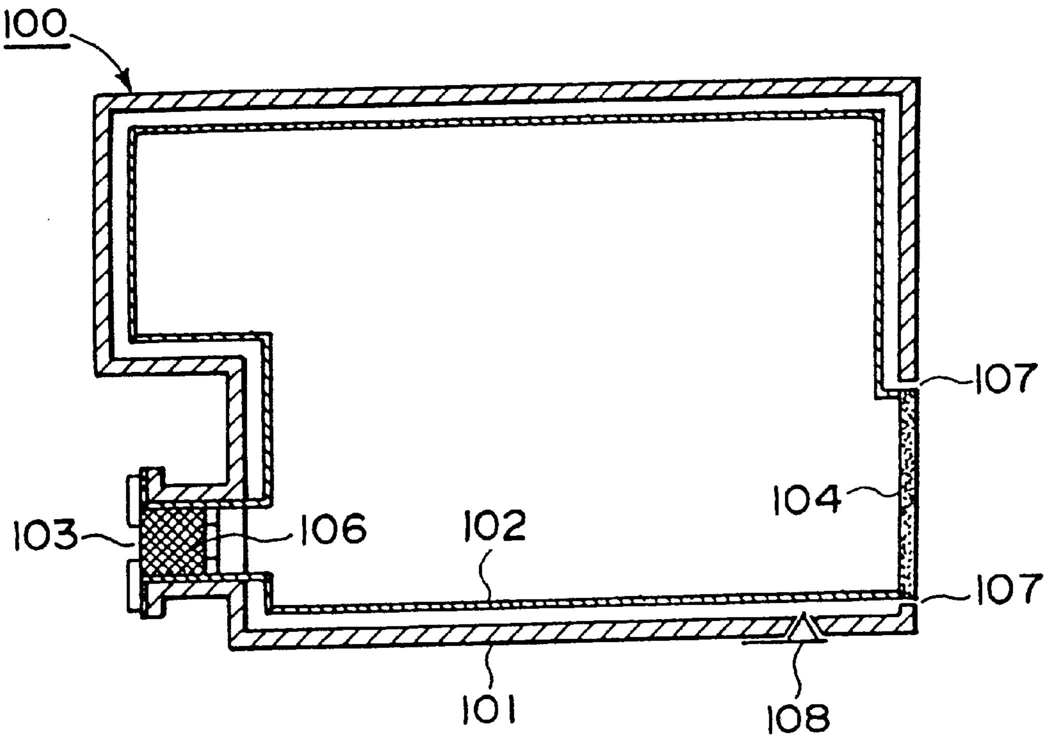
FIG. 4(*a*) is an is a schematic sectional view of another example of a structure of an ink container according to the first embodiment of the present invention.
Figure 4B:
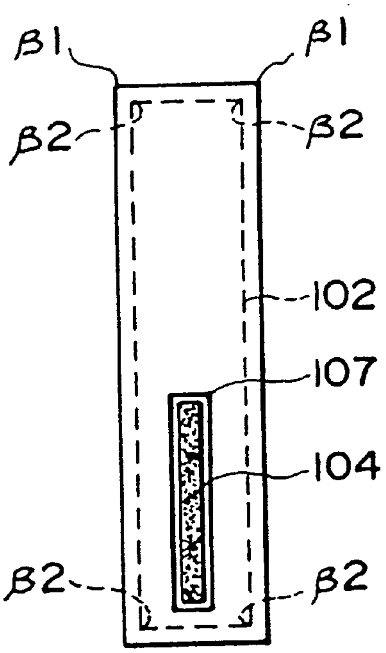

FIGS. 3 and 4 show a modified example of the ink container shown in FIG. 1. FIGS. 3(*a*) and (*b*) and FIGS. 4(*a*) and (*b*) are sectional views and side views, respectively.

The structure of the ink container of the first embodiment will first be described.

In the ink container 100 shown in FIG. 1(*a*), designated by 101 is an outer wall of the ink container, and 102 is an inner wall of the ink container. The ink is accommodated in an ink accommodating portion which is defined by the inner wall 102. The outer wall is provided outside of the inner wall to protect the ink accommodating portion so as to avoid leakage of the ink due to the unintended deformation of the inner wall.

Designated by 103 is an ink supplying portion for the ink supply from the inside to the outside of the container, and functions as a connecting portion with an ink receiving portion of the ink jet head side unshown.

In the ink container of this embodiment, the corners of the inner wall are close to the corners of the outer wall, so that the ink container inner wall 102 is similar in configuration to the ink container outer wall 101, and therefore, the ink container inner wall 102 can be matched with the configuration of the ink container outer wall 101 (outer housing) with a predetermined gap therebetween. Thus, the dead space remaining in a conventional container having a casing and a bladder-like container therein, can be removed, so that the ink accommodation capacity per unit volume of the outer wall can be increased (ink accommodation efficiency can be increased).

Designated by 104 is a welded portion for forming a sealing space by the inner wall 102. The welded portion is formed in the following manner. During the blow molding of the container as will be described in detail hereinafter, a parison for forming the wall of the ink container is sandwiched by metal molds, so that the welded portion is formed. The inner wall portions are welded, and the outer-wall are closely contacted thereto, so that the-outer wall functions to support the inner wall 102, as will be described in detail hereinafter. In this embodiment, as shown FIG. 1(*b*), the configuration of the welded portion 104 is rectilinear as seen from the lateral side. But, the rectilinear shape is not inevitable if in the manufacturing step which will be described hereinafter, the ink container is easily taken out from the mold. The length thereof is not limited to the length used in this embodiment, if it does not project beyond the side.

In FIG. 1(*a*), only the ink supplying portion is indicated with deviation for better illustration purpose of the ink supplying portion 103. If the ink supplying portion is at the position opposed to the welded portion 104 of the lateral side of the ink container, the welded portion is also provided at the ink supplying portion. In such a case, the section is as shown in FIG. 3(*a*).

Designated by 105 is an air vent for introducing the air into between the inner wall 102 and outer wall 101 when the volume of the ink accommodating portion defined by the inner wall 102 is reduced with the consumption of the ink. It may by a simple opening or a combination of an opening and an air entering valve. In the embodiment of FIG. 1, it is a simple opening.

FIGS. 3 and 4 show a modified examples of the air vent.

In the modified example of FIG. 3, a small gap 107 of approx. several 10 μm between the outer wall and the inner wall occurring in the neighborhood of the welded portion 104, is utilized as the air vent. The gap is easily formed by using a material of the inner wall having a low adhesiveness relative to the outer wall and by separating the inner wall 102 from the outer wall 101 by imparting external force to the welded portion 104.

In the modified example of FIG. 4, the outer wall 101 and the inner wall 102 are made of different materials, and the inner wall is separated from the outer wall using residual stress or the like, similarly to the modified example of FIG. 3. The maintaining of pressure balance of the inner wall of the ink container is assisted by provision of the valve 108 open to the outside in the outer wall. In a usual ink supply, the sufficient pressure adjustment is possible by introducing and discharging the air to and from the space between the outer wall 101 and the inner wall 102 through the gap. But the valve 108 is provided to accommodate quick and abrupt pressure change due to the falling of the ink container or the like.

Designated by 106 is an ink discharge permission member having an ink leakage preventing function for preventing the leakage of the ink from the ink supplying portion in the case that slight vibration or external pressure is imparted to the container. In this embodiment, it is in the form of one directional fibrous member of ink absorbing material having meniscus retentivity. The ink accommodating portion is substantially harmetically sealed by the ink discharge permission member 106, and in the case that the ink introduction portion of the ink jet head side is inserted thereinto, the ink is discharged while the sealed state is maintained.

In place of the press-contact member, a rubber plug, a porous material, a valve, a filter or a resin material are usable at the ink discharge permission member 106, depending on the coupling structure between the ink container 100 and the ink jet head.

The description will be made as to the manufacturing method according to this embodiment.

The ink container of an embodiment of the present invention has a double wall structure of molding resin material, wherein the outer wall has a thickness to provide high strength, and the inner wall is of soft material with small thickness, thus permitting it to follow the volume variation of the ink. It is preferable that the inner wall has an anti-ink property, and the outer wall has a shock resistant property or the like.

In this embodiment, the manufacturing method for the ink container uses a blow molding method with the use of blowing air. This is for the purpose of forming the wall constituting the ink container from a resin material not expanded substantially. By doing so, the inner wall of the ink container constituting the ink accommodating portion can resist the load substantially uniformly in any direction. Therefore, despite the swinging motion, in any direction, of the ink in the inner wall of the ink container after some amount of the ink is consumed, the inner wall can assuredly maintain the ink, thus improving the total durability of the ink container.

As for the blow molding method, there are a method using injection blow, a method using direct blow, and a method using double wall blow.

The description will be made as to the method using the direct blow molding used in this embodiment.

Figure 7:
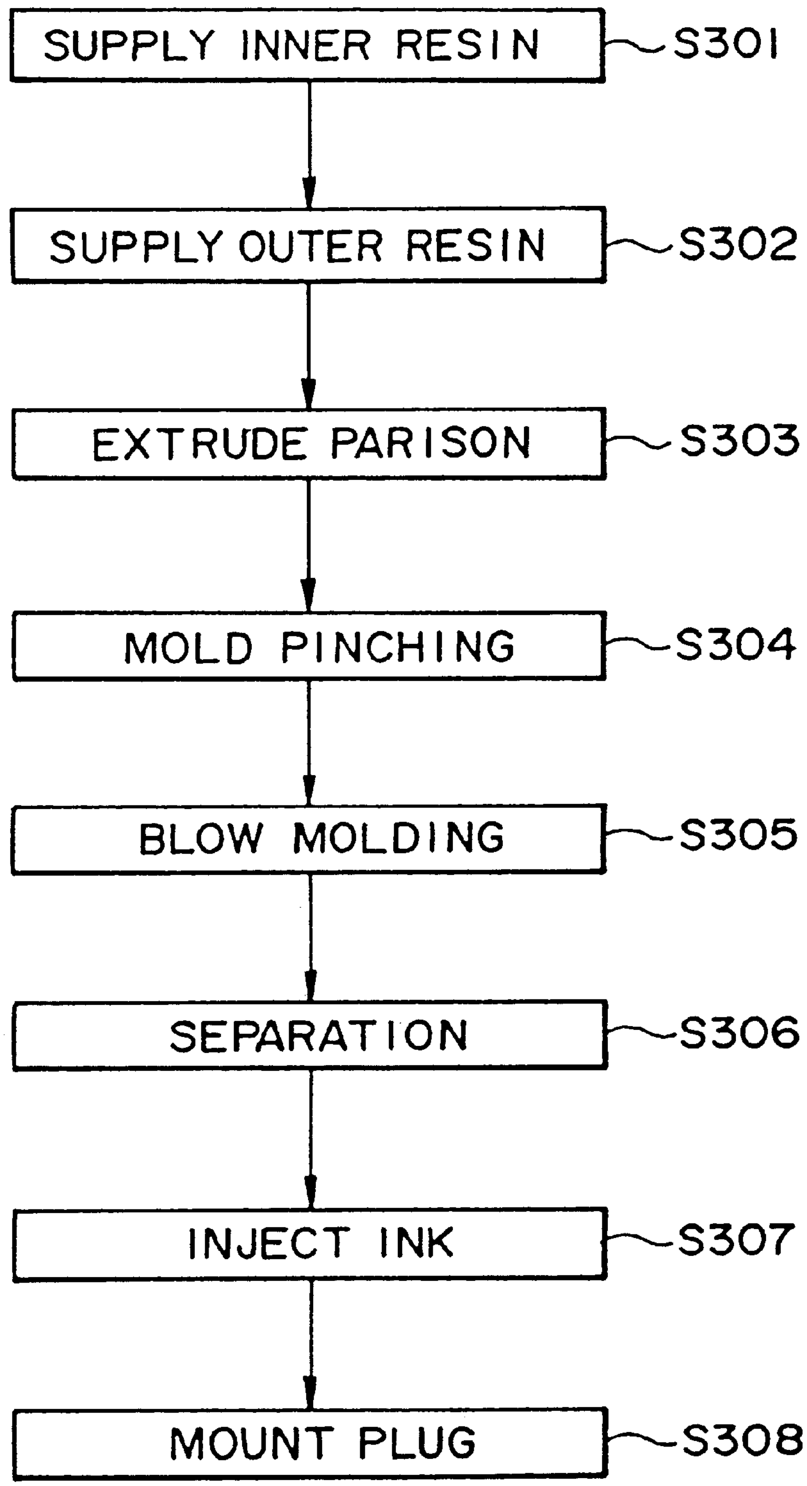
FIG. 7 is a flow chart of manufacturing steps for an ink container according to a first embodiment of the present invention.
Figure 8:
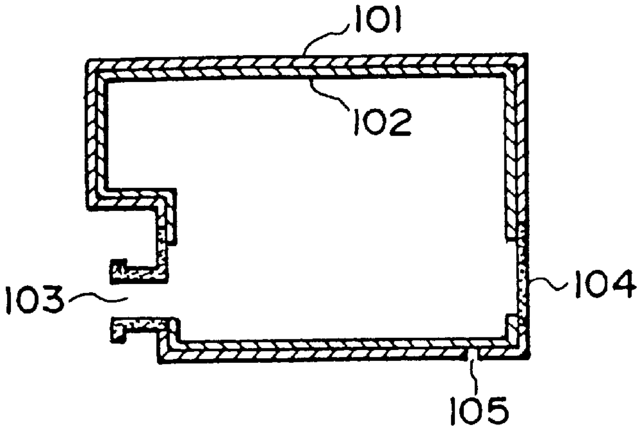
FIGS. 8(*a*1), (*a*2), (*b*1), (*b*2), (*c*1), (*c*2), (*d*1), and (*d*2) is a schematic illustration of an ink container during a manufacturing step of the ink container according to the first embodiment of the present invention.
Figure 8:
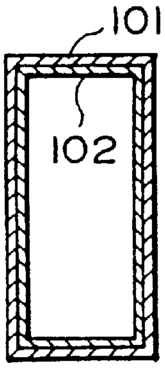
Figure 8:
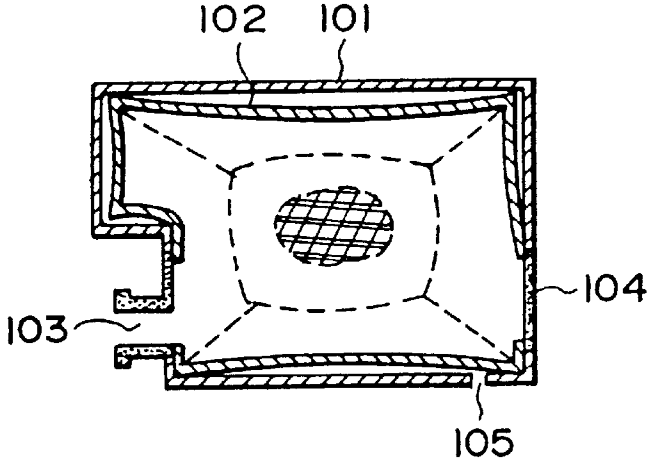
Figure 8:
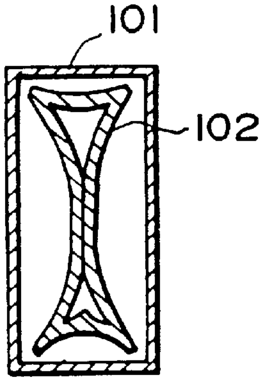
Figure 8:
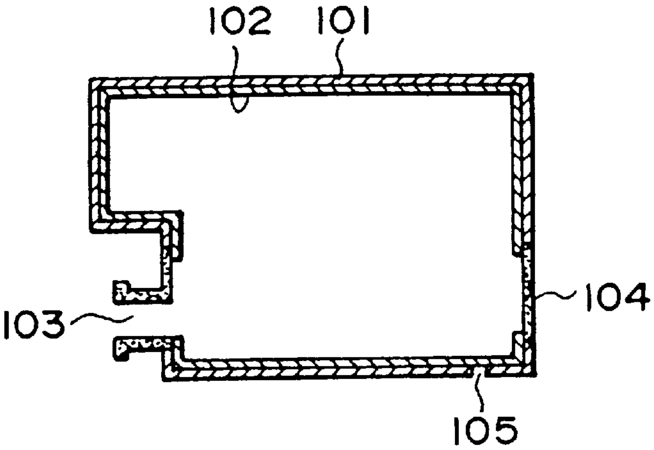
Figure 8:
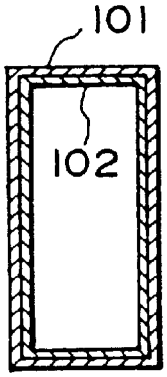
Figure 8:
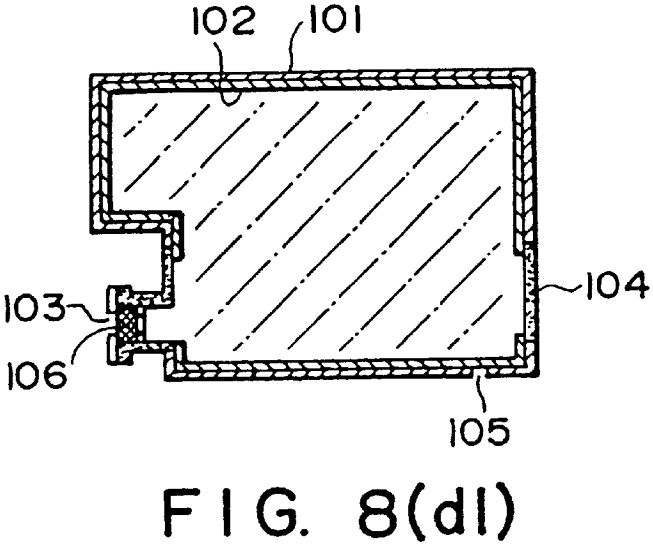
Figure 8:
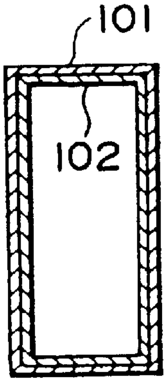

FIGS. 6(*a*)–(*d*) show the manufacturing steps for the ink container, according to this embodiment, and FIG. 7 is a flow chart showing the manufacturing steps for the ink container. FIG. 8 shows the ink container during the manufacturing step, and the suffix 1 indicates the maximum surface area portion of the ink container, and suffix 2 indicates a section parallel to the end surface of the ink container at the central portion of the ink container.

In FIG. 6, designated by 201 is a main accumulator for supplying the resin material constituting the inner wall; 202 is a main extruder for extruding the inner wall resin material; 203 is a sub-accumulator for supplying the resin material constituting the outer wall; and 204 is a sub-extruder for extruding the outer wall resin material. The injection nozzle is in the form of a multi-layer nozzle, and it injects the inside resin material and the outside resin material simultaneously into the mold to produce an integral first and second parison. In this case, the inside resin material and the outside resin material may be contacted to each other when resin material is supplied, or they may be only partly contacted. The materials of the inside resin material and the outside resin material are so selected as to avoid the welding of the resin materials at the contact portion therebetween, or a chemical compound may be added to one of the resin materials when it is supplied into the mold to make them separable. When similar materials are to be used from the standpoint of the liquid contact property relative to the ink, the inside material or the outside material may be of multi-layer structure so that the resin materials are supplied in such a manner that different kind materials are present in the contact portion. The supply of the inside resin material is uniform along the circumference idealy, but it may be locally thin to provide a structure easily followable to the variation of the inside pressure. The locally thin part will extend in the direction of supply of the resin material.

Thus, the outer wall resin material and the inner wall resin material are supplied to the dies 206 through a ring 205 (step S301 S302), a parison 207 constituted by the first and second parisons, is formed (step S303). Metal molds 208 are disposed so as to be able to sandwich the integral parison 207, as shown in FIG. 6(*b*), and they are moved to the positions shown in FIG. 6(*c*) to sandwich the parison 207 (step S304).

Then, as shown FIG. 6(*c*), the air is injected through the air nozzle 209 to effect the blow molding into the inside shape of the metal mold 208 (step S305). The ink container at this time is shown in FIGS. 8(*a*1), (*a*2).

At this time, the inner wall and the outer wall are closely close contacted without gap therebetween. The temperature of the mold during the molding operation is desirably controlled within the range of approx. ±30° C. relative to a reference temperature, since then the variation of the thickness of the walls of individual containers can be reduced.

Then, the inner and outer walls are separated at other than the ink supplying portion (step S306). FIGS. 8(*b*1) and (*b*2) shows the ink container at step S306 in the case that they are separated by vacuum. As for another separation method, the molding resin materials of the inner wall and the outer wall have different thermal expansion coefficients (shrinkage rates). In this case, the separation is effected automatically by decrease of the temperature of the molded product after the blow molding, so that the number of manufacturing steps can be decreased. The portion having been sandwiched by the molds during the blow molding may be imparted by external force after the molding to separate the outer wall from the inner wall, and the gap therebetween may be brought into communication with the air, so that the gap can be used as an air vent. This is preferable in the case of the container for ink jet recording since then the number of manufacturing steps can be reduced.

After the separation between the inner wall and the outer wall, the ink is injected (step S307). Before the injection of the ink, the ink accommodating portion may be shaped into the initial state by compressed air (FIGS. 8(*c*1), (*c*2)), and then the ink injection may be carried out. When the initial state shaping operation is effected, the ink-may be injected by pressure.

The amount of the injected ink may preferably be approx. 90% of the volume of the ink accommodating portion, since then the leakage of the ink can be avoided even upon the external force exerted thereto, the temperature change or the pressure change.

FIGS. 8(*d*1) and (*d*2) show the state of the schematic view after the ink injection. At this time, the inner wall and the outer wall of the ink container are separable when the ink is consumed from the container. After the injection of the ink, the ink discharge permission member is mounted (step S308).

In the above-described blow molding, the processing of the parison 207 is carried out when it has a certain viscosity, so that the inner wall resin material and the outer wall resin material do not have an orientation property.

The thicknesses t1 and T1 of the inner wall resin material and the outer wall resin material after the blow molding are smaller than the thicknesses t, T before the blow molding. The relation between the thicknesses of the outer wall resin material and the inner wall resin material is T>t and T1>t1, for the reason described hereinbefore.

More particularly, the thickness of the outer wall is 1 mm, and the thickness of the inner wall is 0.1 mm, and the surface area of the inner wall is 100 $cm^2$. The material of the outer wall is Noryl(available from General Electric, U.S.A.), and the resin material of the inner wall is polypropylene resin material having a low elastic modulus than the Noryl. The thickness of the inner wall is uniform, and it is contracted as a whole by the internal pressure. By the use of the blow molding, the number of the processes and the number of the parts could be reduced during the manufacturing. Therefore, the yield has been improved, and the inner wall 102 can be easily given the configuration such that the corners of the inner wall 102 are positioned at the corners of the outer wall 101 along the inside of the outer wall 101 of the ink container, as shown in FIG. 1.

More particularly, at the initial state with full ink, the ink container inner wall 102 is similar in configuration to the ink container outer wall 101, and the ink container inner wall 102 can be extended along the inside of the ink container outer wall 101 with a gap in a predetermined range, so that the dead space necessitated in the conventional container having a casing and a bladder-like container therein, can be avoided. By this, the ink accommodation capacity per unit volume of the space defined by the outer wall can be increased (ink accommodation efficiency is increased).

Since the inner wall to which the ink is deposited, is separated from the outer wall, and is in the form of a thin layer, it may be easily taken out of the outer wall, so that it can be disposed of or it can be separately recycled.

Figure 20:
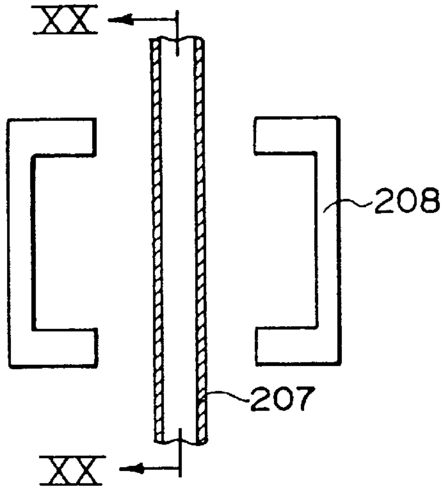
FIGS. 20(*a*1), (*b*1), (*a*2), (*b*2), (*a*3), and (*b*3) is an illustration of manufacturing step for the ink container according to the first embodiment.
Figure 20:
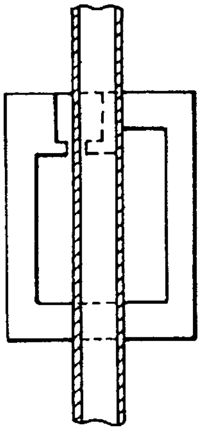
Figure 20:
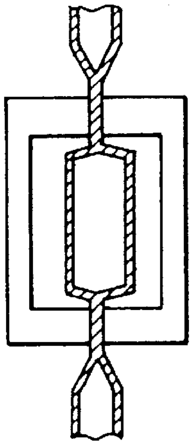
Figure 20:
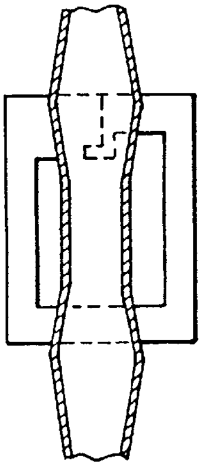
Figure 20:
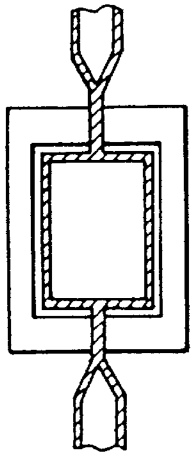
Figure 20:
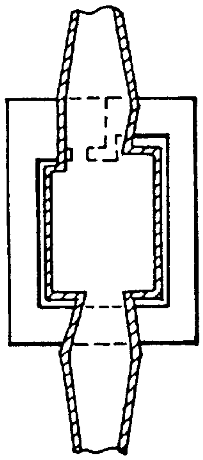

FIG. 20 is a view of the mold of FIGS. 6(*b*)–(*d*), and FIGS. 20(*a*1), (*b*1) and (*c*1) are views as seen in dividing direction and (*a*2), (*b*2) and (*c*2) are views seen in a direction perpendicular to the dividing plane.

Figure 10:
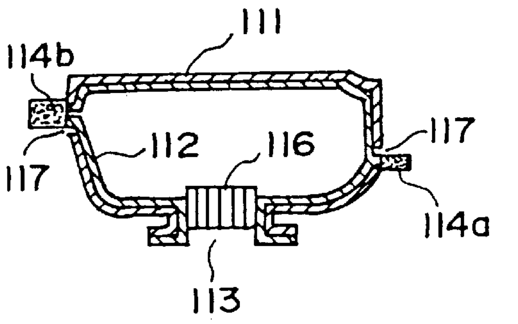
FIGS. 10(*a*1), (*a*2), (*b*1), (*b*2), (*c*1), (*c*2), (*d*1), and (*d*2) is a schematic illustration of the ink container according to the second embodiment of the present invention when it is deformed with the ink discharge.
Figure 10:
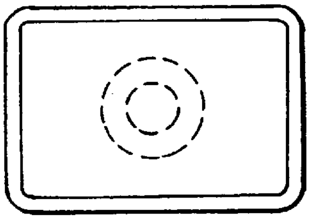
Figure 10:
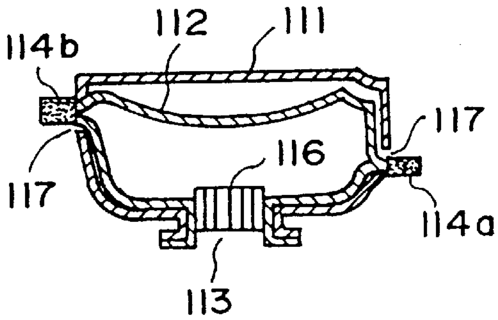
Figure 10:
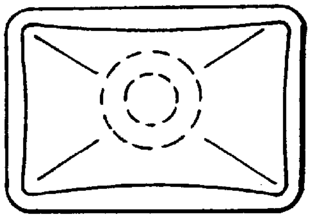
Figure 10:
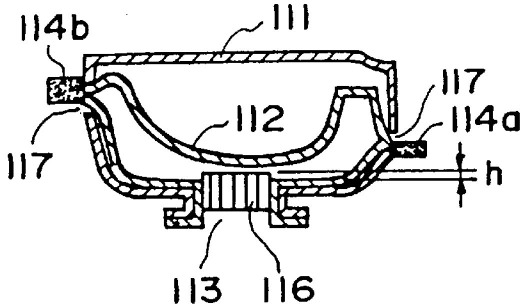
Figure 10:
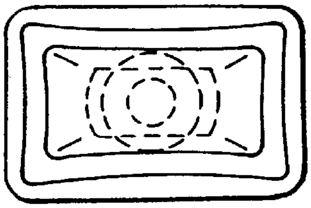
Figure 10:
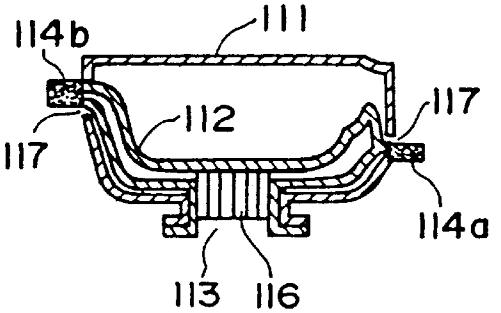
Figure 10:
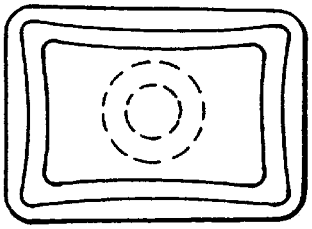

In FIGS. 20(*a*1) and (*a*2) are views before sandwiching the parison by the molds, and FIGS. 20(*b*1) (*b*2) are views after the parison is sandwiched between the molds. In the portion sandwiched by the molds, the circular parison is collapsed into a flat shape and therefore is widened. The nipped portions by the sandwiching remain as the pinch-off portions. In FIGS. 10(*c*1) and (*c*2), the configuration is after the parison is molded by the blowing air.

The description will be made as to the molding resin material constituting the ink container.

The ink container has the 2 heavy structure including the inner wall for accommodating the ink and the outer wall covering the inner wall. Therefore, the material of the inner wall preferably has a flexibility with small thickness, a high liquid contact property and low permeability for gases; and the material of the outer wall has a high strength to protect the inner wall.

Ink containers having the configuration similar to the first embodiment were manufactured using polypropylene resin material, polyethylene resin material and Noryl as the molding resin material. The Noryl is non-crystalline property hardly having a crystalline structure, although the polypropylene resin material and polyethylene resin material have crystal property.

A non-crystalline resin material generally has small heat contraction rate, and crystal resin material generally has a large heat contraction rate, and examples of the non-crystalline plastic resin material include a polystyrene resin, polycarbonate resin, polyvinyl chloride and the like. Polyacetal and polyamide resin partly constitute crystalline portion at a certain ratio under a predetermined condition.

The crystalline plastic resin material has a glass transition temperature (Tg; a temperature at which the molecules begin the micro-Brownian motion and the property changes from glass-like to rubber-like) and a relatively clear melting point. On the other hand, a non-crystalline plastic resin material has a glass transition temperature but does not have clear melting point.

The plastic resin material exhibits steeply changing mechanical strength, specific volume, specific heat, thermal expansion coefficient at the glass transition temperature and the melting point, and therefore, by selecting the combination of the materials using the properties, the release or separation property between the inside and the outside can be improved. For example, the outer wall is made of non-crystalline resin such as Noryl, and the inner wall is made of crystalline plastic resin material such as polypropylene resin material, as in the first embodiment, so that the outer wall is given the high mechanical strength while the inner wall is given the large heat contraction rate and softness.

The resin having the hydro carbon structure wherein the polymer molecules have only the C—C bond and C—H bond, is called a non-polar polymer. A polymer containing a large part of polar atom such as O, S, N, halogen is called a polar polymer. The polar polymer has a large cohesive power in the molecules thus providing a large binding power.

The release property of the resin material can be increased by using proper combination of the non-polar resin materials and combination of non-polar resin material and polar resin material.

Embodiment 2

Figure 9A:
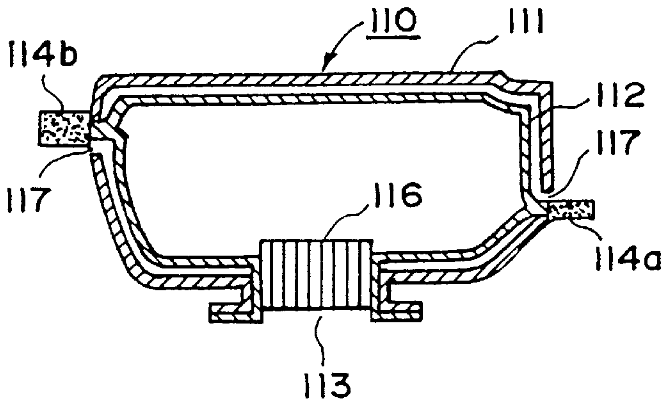
FIG. 9(*a*) is a schematic sectional view of an ink container according to a second embodiment of the present invention.
Figure 9B:
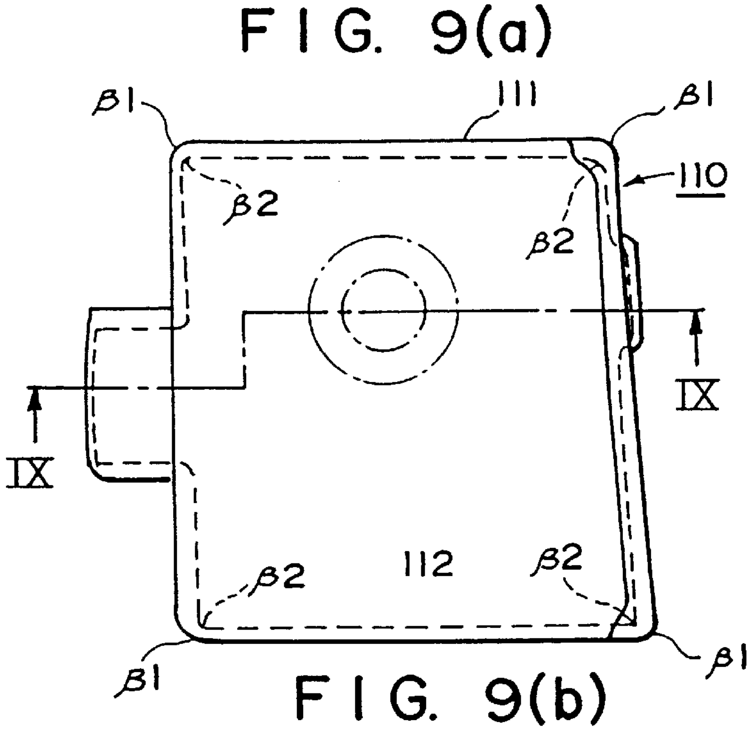
Figure 9C:
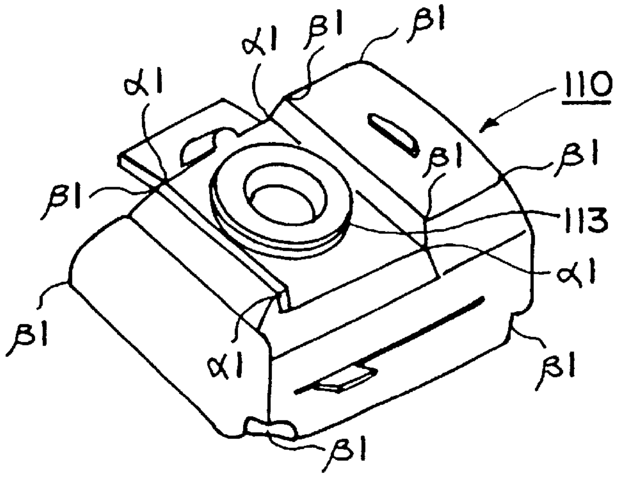

FIG. 9 shows an ink container according to a second embodiment of the present invention. The ink container is usable with a BJ-30 v ink jet printer available from Canon KABUSHIKI KAISHA, Japan. The configuration of the container and the positional relation between the ink supplying portion and the supporting portion of the inner wall is different from those of the first embodiment.

Similarly to the first embodiment, the wall of the ink container has a double wall structure for the purpose of the evaporation prevention of the ink, uniform pressure of the container and ink leakage prevention. The container can follow the inside pressure variation due to the ink decrease. At least one of the corners α of the surface having the ink supplying portion has substantially 90 degrees in three orthogonal planes, by which the inner wall is properly constrained.

In this embodiment, the configuration is slightly close to a cubic member as compared with the first embodiment, and the ink supplying portion 113 is formed in the bottom surface. The side having the ink supplying portion 113 and the side having the welded portion 114 are not opposed to each other. The gap 117 formed adjacent the welded portion is utilized as an air vent.

At least one of the outer maximum surface area sides among the substantially flat outer wall sides, does not have a connection with the inner wall 112, so that the inner wall is easily separable from the outer wall similarly to the first embodiment. In this embodiment, however, the opposed surface has an ink supplying portion 113, rather than it has the same structure.

When inner wall 112 of the ink container of this embodiment deforms with the consumption of the ink in the ink accommodating portion, the deformation begins at the top of the ink container, rather than the opposed two surfaces are deformed. The direction of the deformation is vertically downward, and is the same as the ink supply direction from the ink supplying portion to the recording head. Therefore, in this embodiment, the stabilized ink ejection and the maintaining of the negative pressure as good as in the first embodiment can be accomplished, although the structure is different. FIGS. 10(*a*)–(*d*) show the changes when the ink is discharged from the ink supplying portion of ink container of this embodiment having been filled with the ink. Here, the suffix 1 in FIGS. 10(*a*)–(*d*) indicates sections vertical to the top ceiling surface at the central portion of the ink container, and the suffix 2 indicates the top ceiling surface of the ink container.

FIGS. 10(*a*1) and (*a*2) show the initial state, and corners of the outer wall are disposed at the corners of the inner wall of the ink container, and the inner wall and the outer wall are separable. The container has a pair of maximum surface area sides, and one of them is provided with an ink supply portion and takes a bottom position, the other maximum surface area side takes a top position.

When the discharge of the ink starts from the ink supplying portion, as shown FIGS. 10(*b*1) and (*b*2), the deformation starts at the central portion of the internal wall surface corresponding to the ceiling side of the outer wall of the ink container. At this time, the position of such a corner as is formed by the internal wall surfaces corresponding to the ceiling surface, among the corners β2 of the inner wall, begins to separate from the corresponding corner of the outer wall, and moves down along the outer wall. The corner β2 having started the motion constrain the deformation of the inner wall to a certain extent, and therefore, it cooperates with the intersection α2 to produce the force to restore the initial state of the side of the inner wall corresponding to the ceiling surface, with the result of negative-pressure produced in the ink accommodating portion. Similarly to the first embodiment, the air is introduced into between the inner wall 112 and the outer wall 111, so that the deformation of the inner wall is not obstructed. Thus, the negative pressure is stably maintained during the ink discharge.

When the ink is further discharged, the inner all portion corresponding to the ceiling is further deformed, as shown in FIGS. 10(*c*1) and (*c*2), and the corner formed by the inner wall portion is separated from the corner of the outer wall. On the other hand, the internal wall surface having the ink supplying portion 113 is hardly deformed. This is because, similarly to first embodiment, at least one of the angles of the opposed corners α2 of the inner wall of the ink container is not more than 90 degrees, and therefore, the corners α2 of the inner wall are positioned in a separable state at the corners α1 of the outer wall.

When the ink is further discharged, the final state is reached as shown in FIGS. 10(*d*1) and (*d*2), wherein the internal wall surface corresponding to the ceiling surface and the surface having the ink supplying portion are contacted. The corners β2 formed by the internal wall surface corresponding to the ceiling surface, is further deformed, so that it is completely separated from the outer wall.

There is a possibility that the ink supplying portion is closed by the inside surface of the inner wall. To avoid this, the ink supplying portion is provided with a porous material or fibrous member partly extended into the ink accommodating portion, so that the inside ink can be assuredly discharged out by the meniscus force of the porous material or the fibrous member through the gap formed between the internal wall surface corresponding to the surface of the ceiling and the projected portion.

In this final state, too, the corner α2 constituted by the internal wall surface is separable from the corner α1 of the corresponding outer wall so that the internal wall surface having the ink supplying portion is hardly deformed.

By thus providing the ink supplying portion in the surface opposing to the outer wall surface having the maximum surface area, the negative pressure can be stably maintained from the initial state to the final state, and in addition, the usage efficiency is improved.

The manufacturing method of the present ink container is similar to that for the first embodiment, namely, the blow molding is used. However, in the first embodiment, the ink supplying portion is provided along the parison supply direction, and the air blowing opening is provided by the ink supplying portion. In this embodiment, the ink supplying portion 113 is different from the parison supply direction, and therefore, a process of welding the air blowing opening and a step of providing the ink supplying portion, are additionally required. The air blowing opening may be the welded portion 114*a* or 114*b*. In this embodiment, the welded portion 114*b* is used therefor, and after the molding, the inner wall is welded by the welded portion 114*b*.

The ink container of embodiment 2 can be more easily produced when the step of welding the air blow port member and the step of welding the ink supply portion are added, than when the maximum surface area side is provided in a direction of welded portion, that is, the direction perpendicular to the direction relative to parison supply direction, in the case that the ink supplying portion is along the parison supply direction similarly to the first embodiment.

Embodiment 3

Figure 11A:
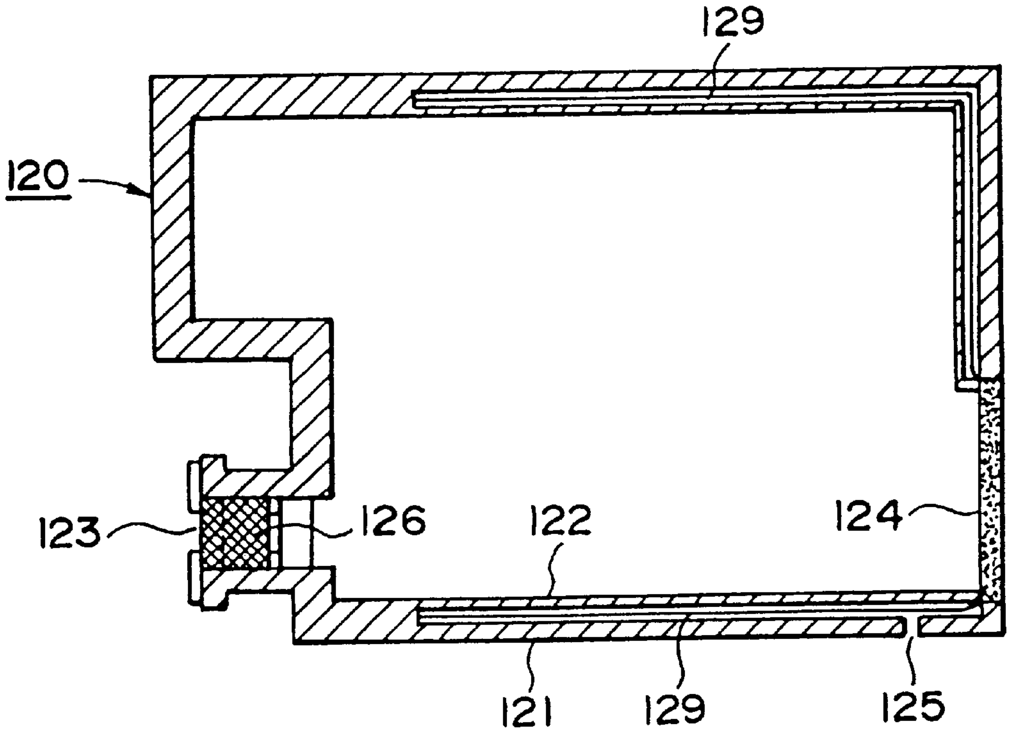
FIG. 11(*a*) is a schematic sectional view of an ink container according to the third embodiment of the present invention.
Figure 11B:
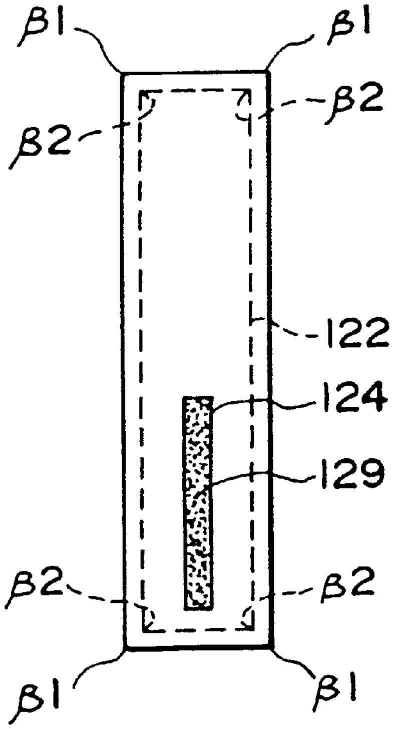
Figure 12A:
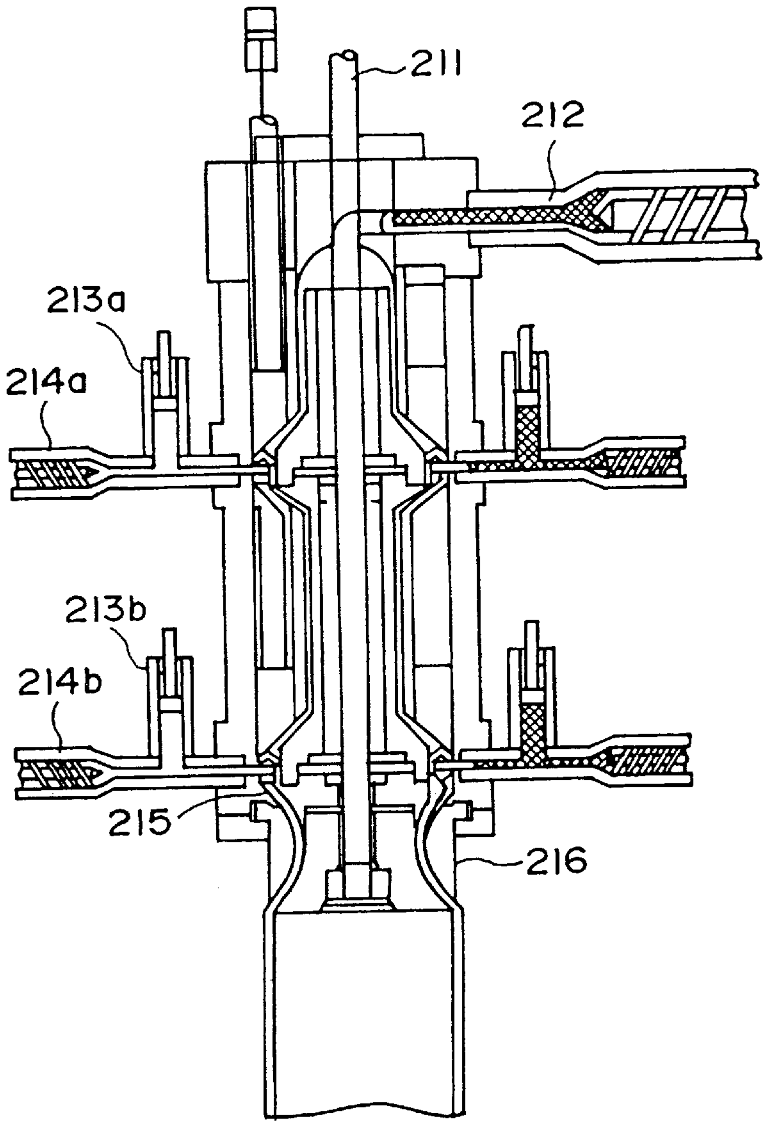
FIGS. 12(*a*)–(*d*) are an illustration of manufacturing steps for the ink container according to a third embodiment of the present invention.
Figure 12B:
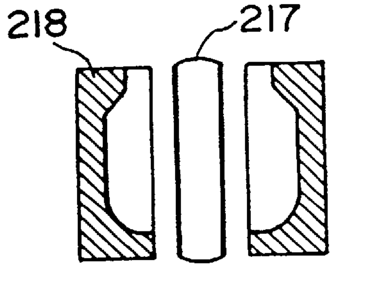
Figure 12C:
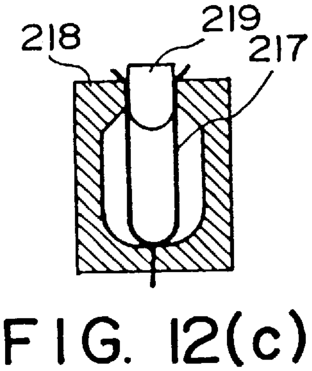
Figure 12D:
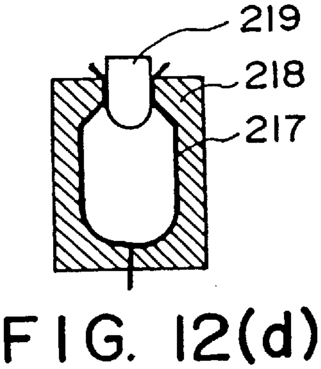

FIG. 11 shows an ink container according to a third embodiment of the present invention. In FIG. 11(*a*) is a sectional view, and FIG. 11(*b*) is a bottom view. In the third embodiment, a separation layer is provided between the inner wall and the outer wall.

Similarly to the first and second embodiment, in order to accomplish the evaporation prevention of the ink, uniformity of the pressure in the container and the leakage prevention of the ink, a plurality of walls are provided such that the ink container follows the inside due to the decrease of the ink in the ink container. Similarly to the first and second embodiment, at least one of the angles of the corners α2 of at a plurality of opposing inner walls as regards the corners α formed by the surfaces including the ink supplying portion, is not more than 90 degrees, so that the deformation confinement portion function is provided.

In the ink container 120 shown in FIG. 11(*a*) designated by 121 is an outer wall of the ink container, and 122 is an inner wall of the ink container.

A part of the outer wall 121 and a part of the inner wall 122 are separated by a separation layer 129, but they are integral at the rest, and the same materials are used although the thicknesses are different. The separation layer 129 is of a material not adhesive to the outer wall 121 or to the inner wall 122 to facilitate the separation therebetween.

What is necessary is that the separation layer 129 is separable from the outer wall 121 and from the inner wall 122, the separation layer may be contacted with or spaced from the outer wall or the inner wall. In any case, only the space between the separation layer 129 and the outer wall 121 is in fluid communication with the outside through an air vent formed in the outer wall 121. The inner wall 122 and the separation layer 129 may be integral.

When the ink is consumed from the inside of the ink container, the inner wall 122 is deformed, and the volume of the space defined by the inner wall reduces with the result of force produced in the direction of elastically returning to the initial state. Since the separation layer has thickness smaller than the inner wall, it is deformed simultaneously with the deformation of the inner wall so as to follow the inner wall. The ambience is introduced into between the separation layer 127 and the outer wall through the air vent 125. The introduction of the ambience assists the deformation of the inner wall and functions to maintain the stabilized negative pressure.

Designated by 123 is an ink supplying portion for supplying the ink out of the container, and is connectable with an ink receiving portion unshown of the ink jet head. Designated by 126 is a ink discharge permission member functioning as a connecting portion with the ink jet head, and is in the form of a press-contact member, rubber plug or valve, similarly to the first embodiment.

In the neighborhood of the ink supplying portion 123, the outer wall 121 and the inner wall 122 are integral, so that the moldability of the ink supplying portion 123 can be increased in the manufacturing step using the blow molding, which will be described hereinafter.

To the ink supplying portion 123, an unshown ink introduction portion of the head side is connected through the ink discharge permission member 126, by which the ink jet recording head can be supplied with the ink. Usually, the ink receiving portion of the recording head is in the form of an ink supply tube as shown in FIG. 5(*a*) to accomplish the stabilized ink supply, in many cases. If the moldability of the ink supplying portion 123 is good, the connection with the ink jet recording head is assured, so that the ink leakage through the connecting portion does not occur, and the mounting-and-demounting of the ink container relative to the ink jet recording head can be repeated, and therefore, it is desirable. Further, since the outer wall and the inner wall are integral adjacent the ink supplying portion 123, the strength adjacent the ink supplying portion 123 can be enhanced. Designated by 124 is a welded portion of the inner wall sandwiched by the outer wall 121 together with the separation layer 129. By the welded portion the inner wall 122 is supported by the outer wall.

In this embodiment, the outer wall has a thickness of 1 mm, and the inner wall has a thickness of 100 $\mu$m, and the separation layer has a thickness of 50 $\mu$m. The surface area of the inner walls approx. 100 $cm^2$. The outer wall and the inner wall are of polypropylene resin material, and the separation layer is of ethylene vinyl alcoholic (EVA).

The polypropylene resin material has a high strength and low permeability of gasses. The EVA resin material has lower permeability of gasses than the polypropylene resin material, and low liquid contact property. In the case of the ink container shown in FIGS. 11(*a*) and (*b*), the inner wall is not directly contacted to the ambience by the provision of the separation layer. The thickness of the outer wall is sufficiently larger than the inner wall or the separation layer. The gas permeability is substantially proportional to the average thickness of the wall, and therefore, the gas permeability is not considered for the outer wall and the inner wall. Thus, the inner wall desirably exhibits the high liquid contact property relative to the ink, and the separation layer desirably has the low gas permeability, and the outer wall desirably has a high strength. In the ink container of this embodiment, the desired materials may be used for the outer wall, the inner wall and the separation layer, respectively (function separation).

The description will be made as to the manufacturing method of the ink container of the third embodiment. The manufacturing method of this embodiment uses the blow molding method as in the first and second embodiment. The blow molding method includes an one using injection blow, an one using direct blow, an one using double wall blow. Here, the direct blow molding method will be described, particularly as to the portion different from the first and second embodiments.

Figure 13:
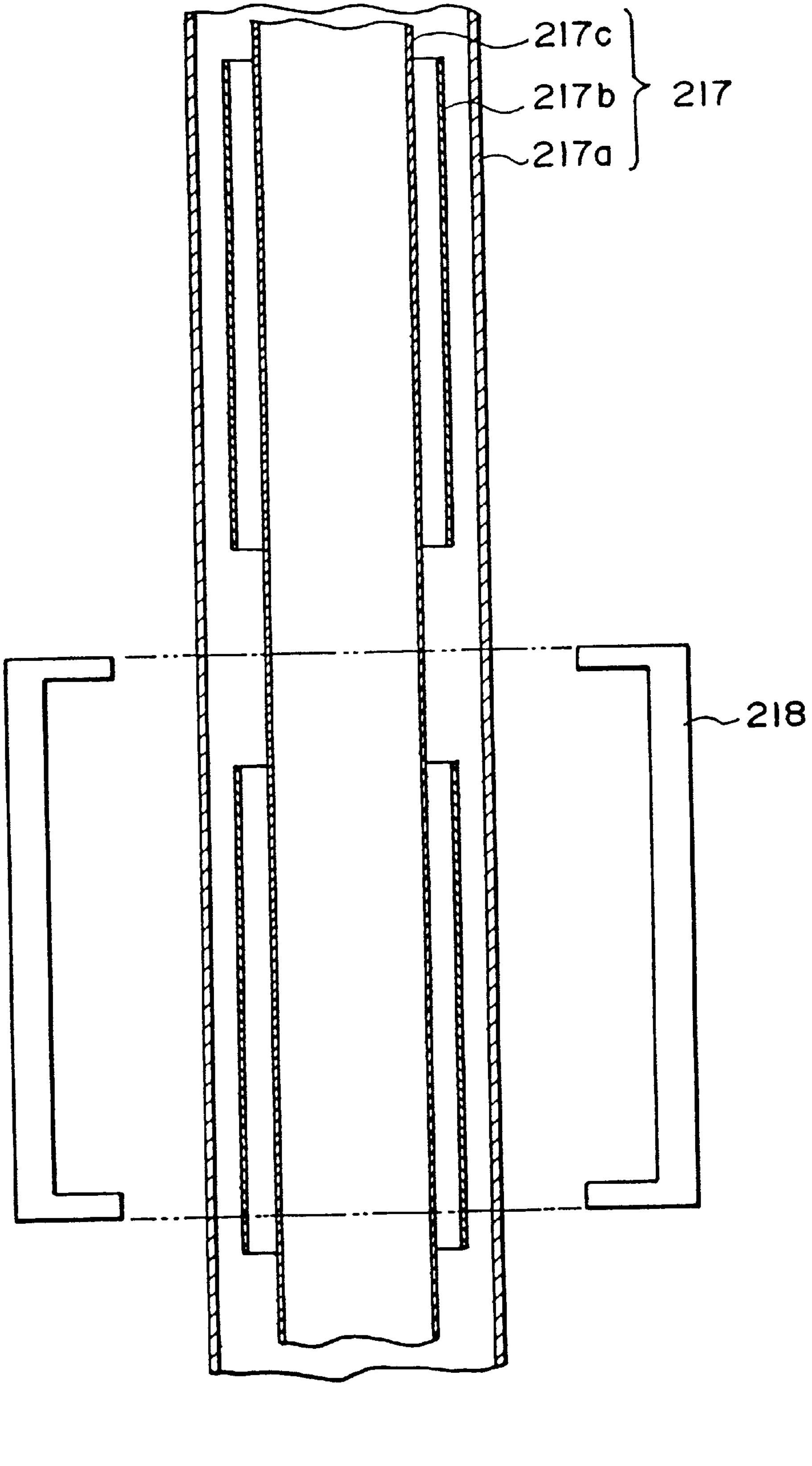
FIG. 13 is an illustration of a nipping portion of a parison and metal mold having intermittent separation layer.

FIGS. 12(*a*)–(*d*) show the manufacturing step of the ink container of this embodiment, and FIG. 13 shows a sandwiching portion of the metal mold and a parison intermittently including the separation layer.

In FIG. 12, designated by 211 is a main accumulator for supplying the resin material for the inner wall; 212 is a main extruder for extruding the inner wall resin material; 213*a* is a sub-accumulator for supplying the separation layer resin material; 214*a* is a sub-extruder for extruding the separation layer resin material; 213*b* is a sub-accumulator for supplying the outer wall resin material; and 214*b* is a sub-extruder for extruding the outer wall resin material. The inner wall resin material, the separation layer resin material and the outer wall resin material thus supplied, are supplied to the dies 216 through the ring 215 so that a parison 217 integrally comprising them is formed. The parison 217, as shown in FIGS. 12(*b*)–(*d*), is molded by the metal mold 218 for sandwiching the parison 217 and by the air nozzle 219 for injecting the air at the top.

Figure 14:
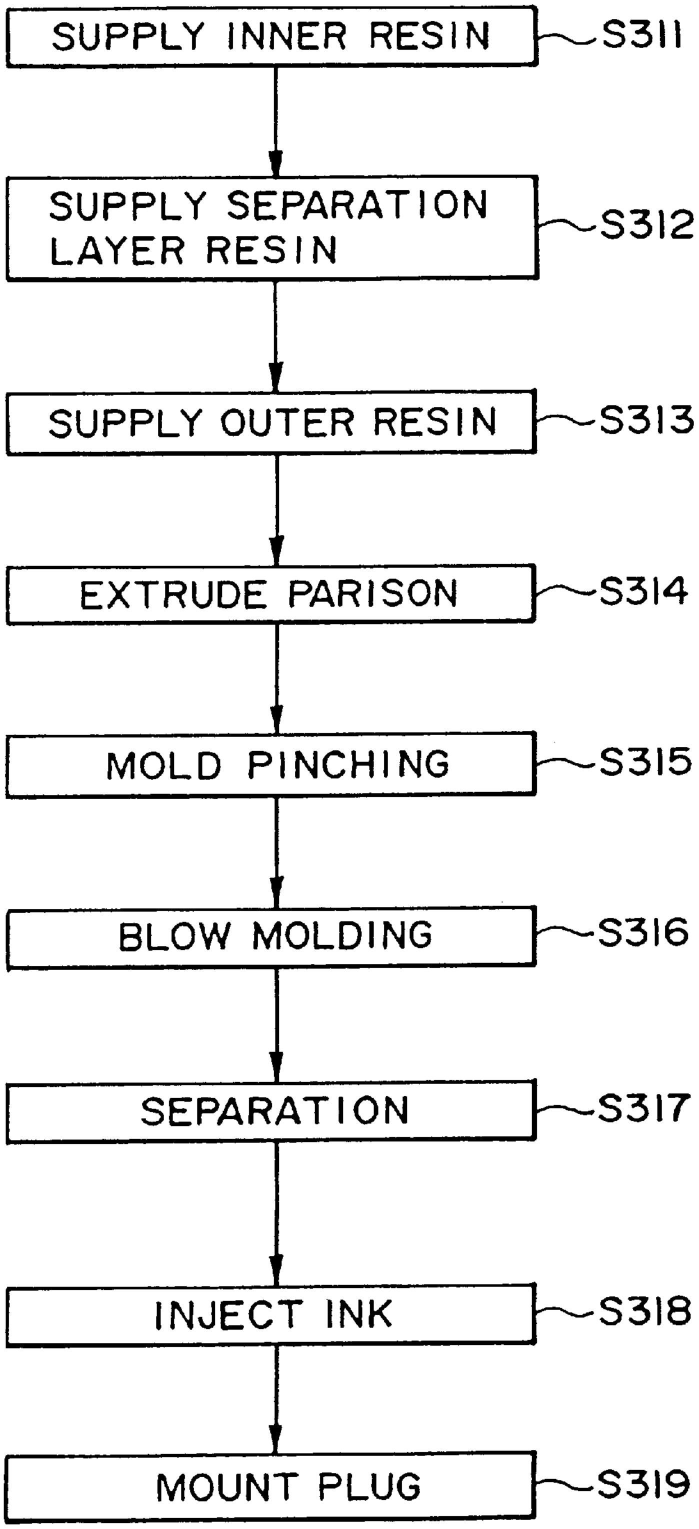
FIG. 14 is a flow chart of manufacturing steps of the ink container according to the third embodiment of the present invention.

Referring to FIGS. 13 and 14, the description will be made as to the manufacturing process for the ink container.

The inside material 217*c*, the separation resin material 217*b* and the outside resin material 217*a* are supplied (step S311, S312, S313), so that the parison 217 is extruded (step S314). The supply of the resin material, as shown in FIG. 13, is such that the inner wall resin material 217*c* and the outer wall resin material 217*a* are continuously supplied, but the separation resin material 217*b* is intermittently supplied.

The metal mold 218 capable of sandwiching the parison 217 is moved from the state shown in FIG. 2(*b*) to the state shown in FIG. 2(*c*) to sandwich the parison 217 (step S315). Then, as shown in FIG. 2(*c*), the air is injected by the air nozzle 219 to effect the blow molding into the shape of the metal mold 218 (step S316).

Then, the container is separated from the metal mold (step S317), and the ink is injected (step S318). Thereafter, the cap including the ink discharge permission member 126 is mounted (step S319).

In this blow molding, the parison 217 is processed while it has a certain viscosity, and therefore, the inner wall resin material, the outer wall resin material and the separation layer resin material do not have an orientation property.

The thicknesses t1, T1 and b of the inner wall resin material, the outer wall resin material and the separation resin material after the blow molding are smaller than the thicknesses t, T and b thereof before the blow molding. In this embodiment, the outer wall resin material and the inner wall resin material satisfy T>t and T1>t1. Since the separation layer is used only to separate the inner wall from the outer wall, the thickness thereof is not limited, but is desirably thinner than the inner wall in consideration of the liability that the separation layer does not sufficient1y separate them. Therefore, the thickness b1 of the separation layer satisfies b1=t1×(1/2) in this embodiment.

Embodiment 4

Figure 18A:
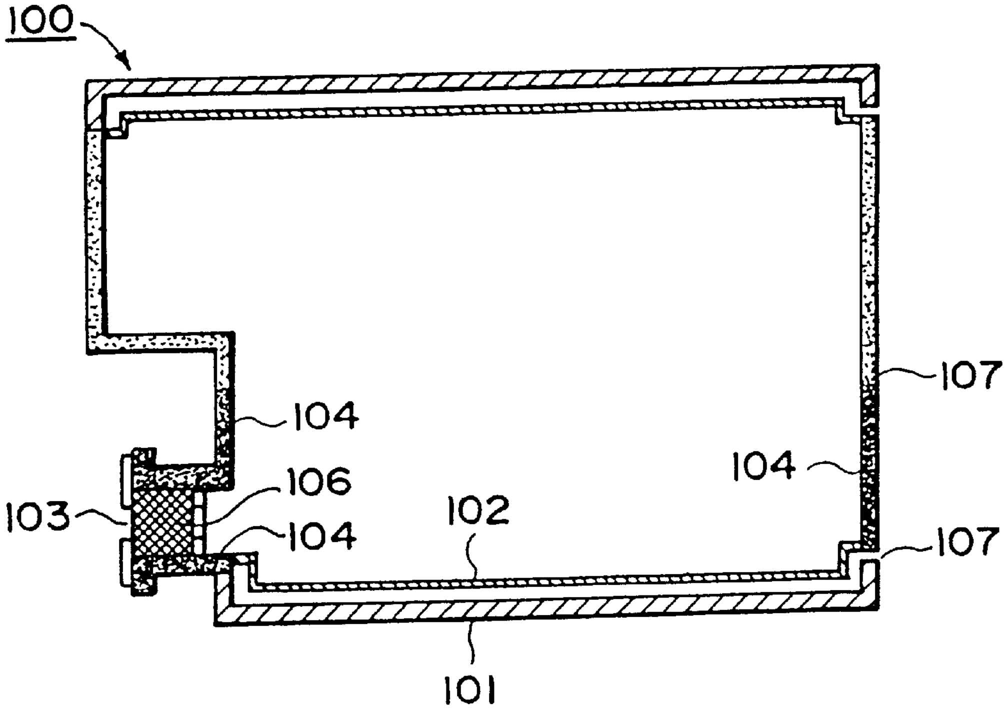
FIG. 18(*a*) is a schematic sectional view of another example of an ink container of the first embodiment of the present invention.
Figure 18B:
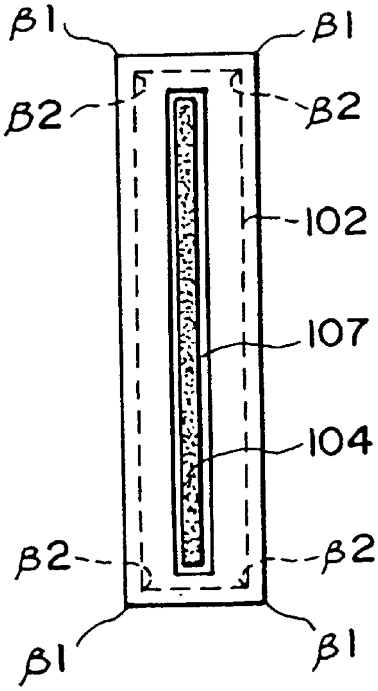

FIG. 18 shows an ink container according to a fourth embodiment of the present invention. In FIG. 18(*a*) is a sectional view, and FIG. 18(*b*) is a side view. In embodiment, the diameter of the parison is made larger to be substantially equal to the entire width of the container, as is different from the foregoing embodiment.

The different point will be described.

Figure 16:
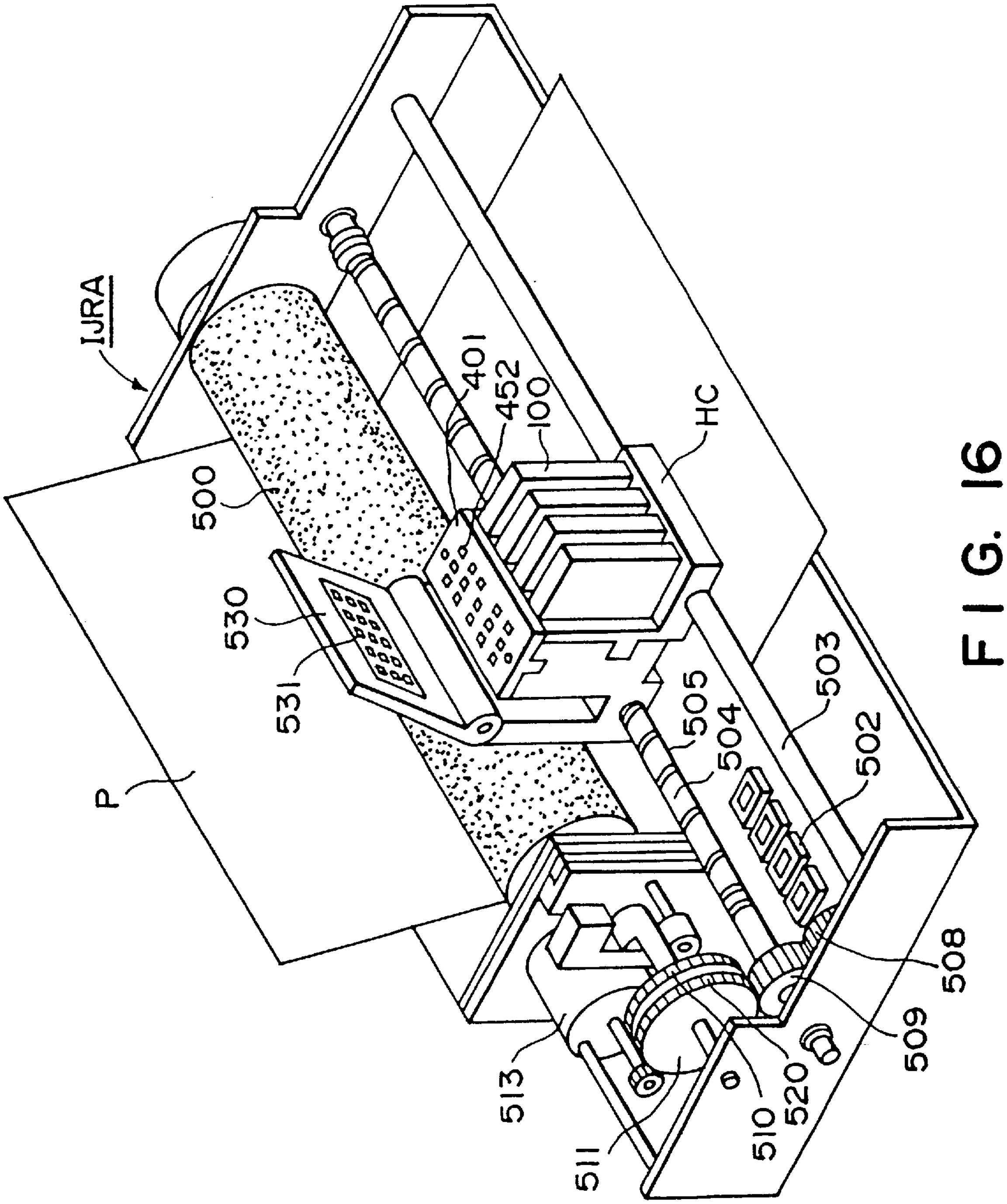
FIG. 16 is a schematic view of an ink jet recording apparatus carrying the ink container according to an embodiment of the present invention.

In FIG. 16(*a*), designated by 104 is a portion where the inner wall is welded, and the inner wall is nipped by the outer wall. This portion is called "pinch-off portion". The pinch-off portion 107, as shown in the Figure, is formed substantially along the entire width in the height direction of the ink container 100.

The manufacturing method will be described. By thus reducing the expansion of the parison, the distance to the corner of the ink container from the parison can be reduced in effect, so that the thicknesses of the corners can be made close to equal to each other, thus the variations of the strengths of the corners can be reduced.

By the provision of the pinch-off portion substantially over the entire width of the lateral side of the container, as in this embodiment, the supporting portion of the inner wall is stabilized, and therefore, the negative pressure can be produced stably. By forming the wide pinch-off portion at each of the opposing positions, the strength of the ink container per se can be increased, so that the reliability against the shock or the like is increased.

According to this embodiment, the similar effect can be provided irrespective of the configuration of the ink container. However, it is particularly desirable that the configuration of the container is symmetrical, and the pinch-off portion is faced to a side adjacent to the side having the maximum area, since then the negative pressure can be produced. More particularly, by resisting the deformation of the inner wall at the position opposed through the maximum area side, the deformation of the maximum side due to the ink consumption can be made regular. This further stabilizes the negative pressure together with the above-described corner deformation confinement.

Embodiment 5

Figure 19A:
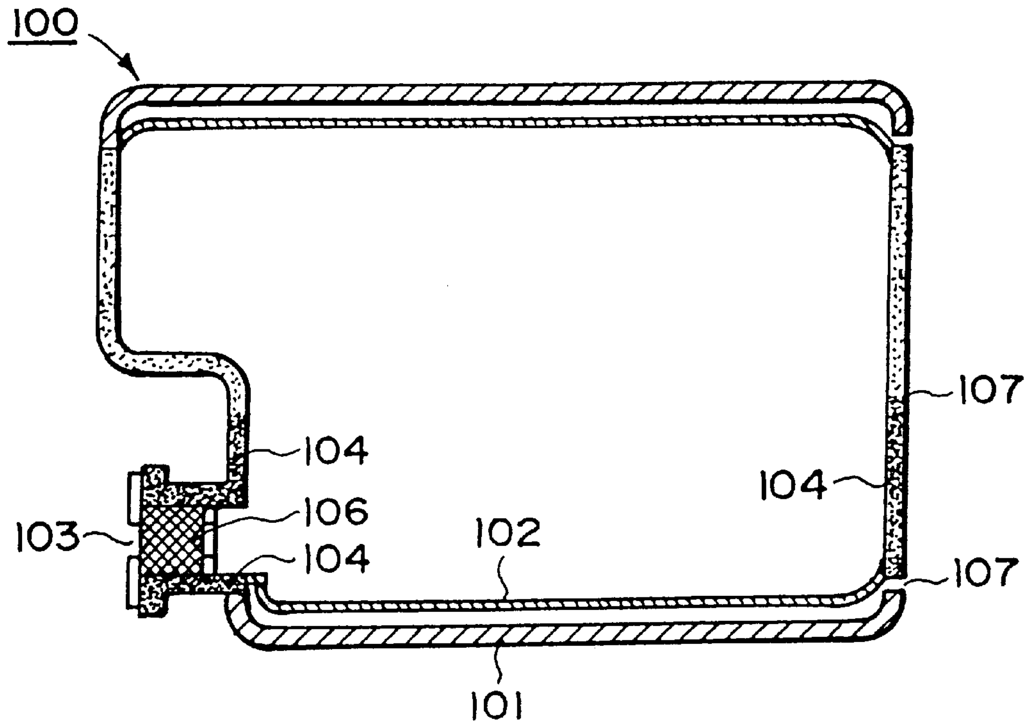
FIG. 19(*a*) is a schematic sectional view of a further example of an ink container according to the first embodiment of the present invention.
Figure 19B:
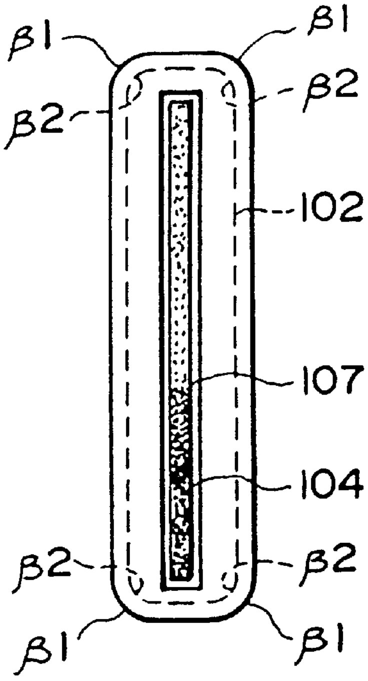

FIG. 19 is a schematic view of an ink container according to embodiment 5. FIG. 19(*a*) is a sectional view, and FIG. 19(*b*) is a side view.

In embodiment, as compared with the above-described ink container, the corners and crossing portions between surfaces are slightly rounded.

By doing so, the corners and the crossing portions are stably formed, when the parison is expanded to the inside of the metal mold. Additionally, the occurrence of a pin hole can be significantly prevented.

Furthermore, the film thicknesses of the outer wall and inner wall are made substantially uniformly by the rounded shape, so that stabilized surface movement is permitted. By the uniformity of the film thicknesses at the corners and intersections, the strength can also be stabilized.

Furthermore, the corners are locally spherical, and the intersecting portions are locally cylindrical, so that the strength thereof is enhanced, and the collapsing thereof is effectively prevented. Thus, the collapse of the surface can be stably prevented.

In the case of this embodiment, the following relations apply:

(anti-collapse force of the surface per se)<(anti-collapse force of the crossing portion between adjacent sides)<(anti-collapse force of the corner).

therefore, the precedence order of collapses can be regulated, thus accomplishing the stabilized negative pressure generation.

The manufacturing method in the foregoing embodiments are usable for manufacturing the container of this embodiment, if the portions of the metal mold 208 (FIG. 12) corresponding to the corners and crossing portions between sides are rounded.

The manufacturing of the metal mold is easier, so that the productivity is improved, and therefore, the cost is reduced.

This embodiment is applicable to any shape of the container, and therefore, usable with any of the foregoing embodiment, and is usable with an embodiment which will be described below wherein only one wall is used.

Embodiment 6

FIG. 21 is a schematic view of an ink container according to embodiment 6.

FIG. 21(*a*) is a sectional view, FIG. 21(*b*) is a side view, and FIG. 21(*c*) is a perspective view.

In this embodiment, one of the inner and outer walls is removed, or only one is used as the container structure.

Similarly to the first to fifth embodiments, the used manufacturing method is blow molding using blowing air. In the first and second embodiments, the parison is made of different resin materials using a main extruder 202 and sub-extruder 204, and the parison is fed into the mold, where the blowing air is supplied. In this embodiment, only the main extruder 202 is used with a single resin material. The resin material may by an integral different resin materials having different liquid contact property and evaporation property.

In this type, the air vent is not necessitated, and the outer wall is not used.

The pinch-off portion is not provided at the maximum area portion, so that the thickness of the maximum area side continuously decreases from the center portion of the maximum area side to the corners. When the container is produced in the same manner as in the foregoing embodiments with the outer wall, and then, the outer wall is removed, the distribution of the thickness of the outer wall is such that the central portion of the maximum area side of the inner wall is inwardly convex, as in the foregoing embodiments. The convex configuration and the distribution of the thickness are effective to permit smooth deformation of the maximum convex configuration side from the central portion thereof in response to the change in the negative pressure in the ink container, while increasing the convexity.

The corners move toward the center portion of the maximum area side in accordance with the decrease of the ink in the ink container, but the configuration of the corner is maintained. In this embodiment, the inside surfaces of the maximum area surfaces are brought into contact to each other with the reduction of the ink in the ink container, before the intersection or edge line formed between the maximum area side and a side adjacent thereto, collapses. Then, the contact area between the maximum area surfaces increases with the reduction of the ink. Therefore, the smooth deformation of the maximum area side is assured.

Because of the regularity of the deformation, the property thereof is suitable for an ink container.

Figure 15A:
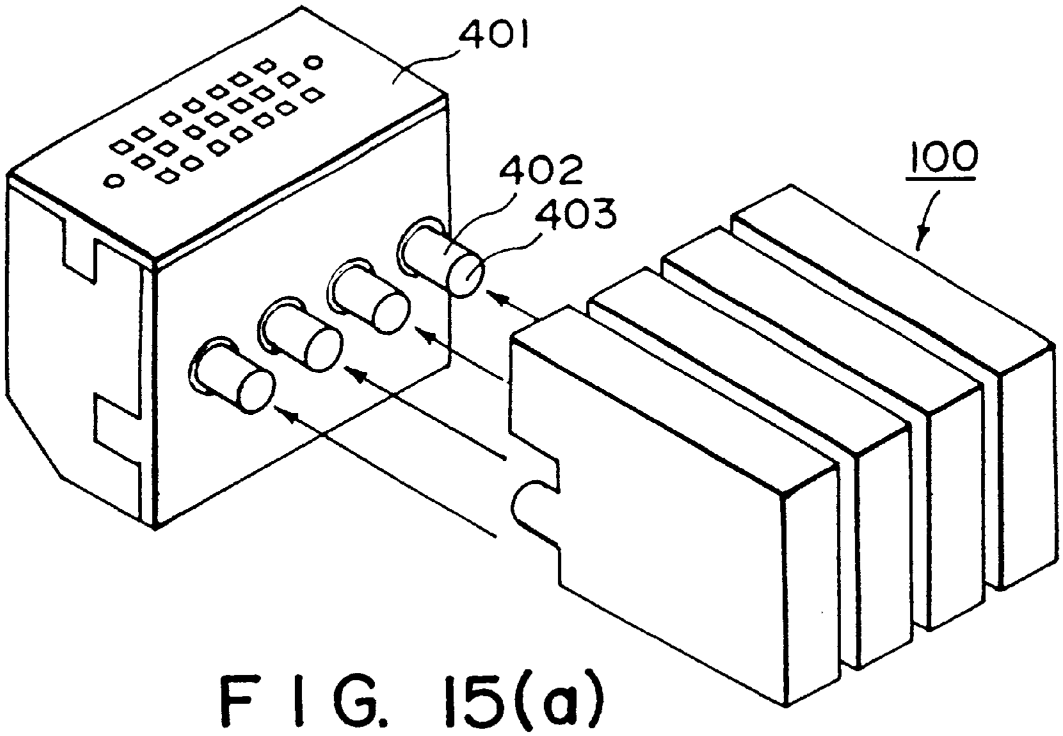
FIG. 15(*a*) is a schematic perspective view of an ink container and a recording head connectable to the ink container, according to an embodiment of the present invention.
Figure 15B:
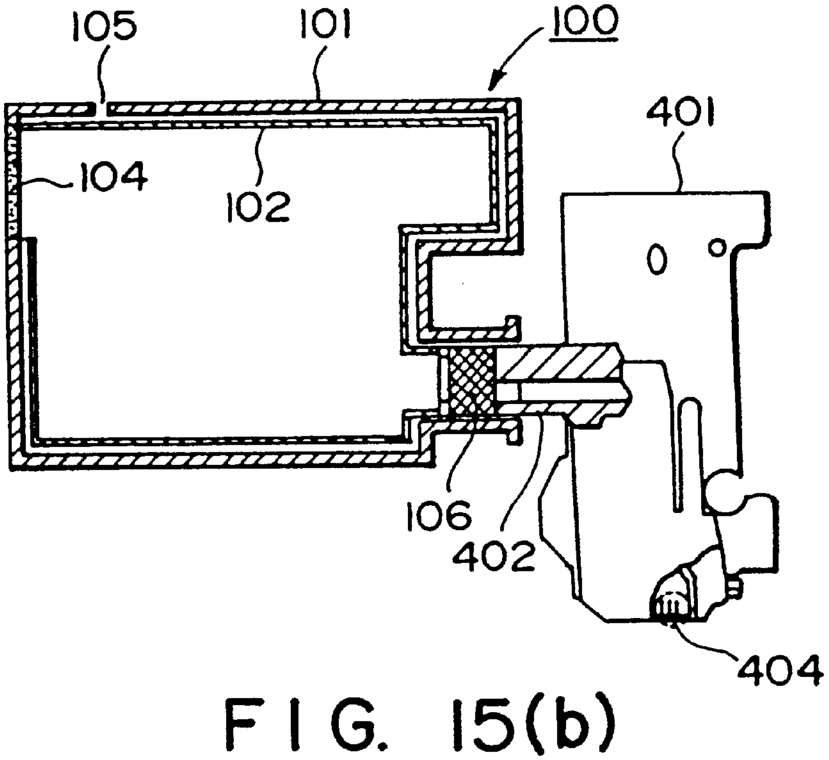

The description will be made as to the use of the ink container according to an embodiment with a recording head. FIG. 15(*a*) is a schematic view of a recording head as a recording means connectable with the ink container of the present invention, and FIG. 15(*b*) shows the recording head and the ink container connected with each other.

In FIG. 15(*a*), designated by 401 is a recording head unit as the recording means, and includes as an unit black, yellow, cyan, magenta recording heads to permit full-color printing. Each of the recording heads includes liquid flow paths each having ejection outlets for ejecting the ink, and heat generating resistors for ejecting the ink through the ink ejection outlets.

Designated by 402 is an ink supply tube for introducing the ink into the recording head portion, and it has at one end a filter 403 for trapping the foreign matter or the bubble.

When the above-described ink container 100 is to be mounted to the recording head unit 401, the ink supply tube 402 is connected to a press-contact member 106 provided in the ink container 100, as shown in FIG. 15(*b*).

After the ink container mounting, the ink in the ink container is fed into the recording head side by unshown recovering means or the like provided in the recording device, so that ink communication state is established. Thereafter, during the printing operation, the ink is ejected from the ink ejection portion 404 in the recording head so that the ink is consumed from the inside of the ink container inner wall 102.

In this embodiment, the ink supplying portion of the ink container is disposed at a lower position than the center thereof. Thus, there is no need of adjusting the ejection power of the recording head side despite the change of the ink remaining amount in the ink container, and in addition, the usage efficiency of the ink can be increased (the amount of the ink actually usable is increased).

Further, since the ink container of each of the embodiments, is capable of providing the negative pressure by itself, the press-contact member, valve, rubber plug or another ink discharge permission member provided at the ink supplying portion will suffice if it can retain the ink when the ink container is removed from the recording head.

The description will be made as to an ink jet recording apparatus for effecting the recording using the ink container of FIG. 1 embodiment. FIG. 16 is a schematic view of an ink jet recording apparatus using the ink container of this embodiment.

In FIG. 16, the head unit 401 and the ink container 100 are fixing-and-supported on a carriage of the ink jet recording apparatus by unshown positioning means, wherein the recording head and the ink container are respectively detachable.

The forward and rearward rotation of the driving motor 513 is transmitted to a lead screw 504 through drive transmission gears 511 and 509 to rotate it, and the carriage has a pin(unshown) engageable with a spiral groove 505 of the lead screw 504. By this, the carriage is reciprocated in a longitudinal direction of the recording apparatus.

Designated by 502 is a cap for caping a front side of each recording head in the recording head unit, and is used to effect the sucking recovery of the recording head through the opening in the cap by unshown sucking means. The cap 502 is moved by the driving force transmitted through the gear 508 or the like to cap the ejection side surface of the recording head. Adjacent the cap 502, an unshown cleaning blade is provided, and is supported for vertical movement. The blade is not in the disclosed form, but a known cleaning blade is usable.

The capping cleaning sucking recovery are carried out when the carriage is at the home position by the operation of the lead screw 505. Any other known mechanism is usable for this purpose.

Electrical connection pads 452 of the recording head unit mounted to the carriage, are brought into contact to the connection pad 531 by the rotation of the connecting plate 530 provided on the carriage about a predetermined axis, thus establishing the electrical connection. Since a connector is not used, no excessive force is applied to the recording head.

In the foregoing description, the outer wall or the inner wall is of single layer structure, but it may of multi-layer structure for the purpose of increasing the anti-impact property, for example. Particularly, a multi-layer structure outer wall is effective to damage to the ink container during transportation or upon mounting thereof. An ink container may be the one integral with the ink jet recording head, may be the one detachably mountable relative to an ink jet recording head, or the like. The present invention is applicable to any type.

In the foregoing description, the ink container is used in the field of the ink jet recording, but is usable to a liquid accommodating container for supplying liquid with negative pressure to an outside member or element such as a pen.

A manufacturing method for the container of FIG. 21 embodiment, will be described. Also, an additional description will be made as to the outer wall structure, and the effect of the outer wall to the inner wall in each of the foregoing embodiments.

It is considered that the mold is shape beforehand to provide the desired curvature. The container of FIG. 21 embodiment can be manufactured by producing only the outer wall or inner wall in the direct blow manufacturing method.

In the direct blow manufacturing method, the separable outer wall and inner wall are produced from a cylindrical parison by uniformly expanding it to the inside surfaces of the substantially prism shaped mold by air blow.

Therefore, the thickness of the inner wall is thinner in the corners than in the center portion region of the side surfaces. The same applies to the outer wall, that is, the thickness is thinner in the corners than in the center portion region of the side surfaces.

Therefore, the inner wall is formed as if it is laminated on the inside of the outer wall which has a thickness distribution gradually decreasing from the central portion of each of the sides to the corners. As a result, the inner wall is given an outer-surface matched with the inner surface of the outer wall. Since the outer surface of the inner wall follows the thickness distribution of the outer wall, the inner wall becomes convex inwardly. These structures are desirable particularly in the maximum area side since they assist the smooth deformation of the inner wall. The degree of convex shape of the inner wall may be not more than 2 mm, and more particularly, the degree of the convex shape of the outer surface of the inner wall is not more than 1 mm. The convex configuration may by within the measurement error range in a small area side, but it a desirable nature since it assists to provide regularity of precedence of deformations of the prism ink container.

Additional description will be made as to the outer wall. As described hereinbefore, one of the functions of the outer wall is to constrain the deformation of the corners of the inner wall. To accomplish this function, it desirably covers the corners of the inner wall and desirably maintain the shape of the inner wall against the deformation. Therefore, the outer wall or inner wall may be covered with a plastic resin material, metal or thick paper such as. The outer wall may cover the entirety of the inner wall, or it may be in the form of corner covers which may be connected with metal rods or the like. The outer wall may be of mesh structure structure.

The material for the liquid accommodating container may be polyethylene resin material, polypropylene resin material, and the material of the inner wall desirably has a stretching elastic modulus of 15–3000 (kg/cm$^3$).

Within this range, the proper material can be selected in consideration of the configuration, thickness and desired negative pressure such as of the container.

While the invention has been described with reference to the structures disclosed herein, it is not confined to the details set forth and this application is intended to cover such modifications or changes as may come within the purposes of the improvements or the scope of the following claims.

What is claimed is:

1. A manufacturing method for a liquid container capable of generating a negative pressure, wherein said liquid container includes:

an outer wall; and an inner wall having an outer surface equivalent to an inside surface of the outer wall and having a liquid accommodating portion capable of containing liquid therein, and liquid supply portion for supplying the liquid out of the liquid accommodating portion;

wherein said liquid container has a polygonal cross-section having sides and corner portions, said method comprising the steps of:

providing a mold corresponding to an outer shape of the liquid container;

providing a substantially cylindrical shaped first parison for the outer wall, said first parison having a diameter smaller than that of the mold;

providing a substantially cylindrical shaped second parison for the inner wall; and expanding the first and second parisons by injecting air so that a thickness of the inner wall in a corner portion is smaller than that in a central portion of each side, so that the first parison extends along the mold, so that the inner wall and the outer wall are separable from each other, and so that a space defined by the inner wall and a space defined by the outer wall are similar in configuration to each other.

2. A method according to claim 1, wherein said first and second parisons are of resin materials having different heat contraction rates.

3. A method according to claim 1, wherein the liquid supply portion is provided in a side substantially perpendicular to a direction in which said parisons are fed to the mold.

4. A method according to claim 1, wherein the liquid supply portion is provided in a side substantially parallel to a direction in which said parisons are fed to the mold.

5. A method according to claim 1, wherein in said expanding step, at least the inner wall is expanded without elongation.

6. A method according to claim 1, wherein said second parison comprises an inner wall layer for forming the inner wall and a separation layer, and said inner wall layer is continuously fed to the mold, and the separation layer is fed intermittently to the mold.

7. A method according to claim 1, wherein after the expanding step, the inner wall and the outer wall are separated from each other, and the liquid is injected.

8. A manufacturing method for a liquid container, said method comprising:

providing the liquid container, comprising:

a substantially polygonal outer wall provided with an air vent portion and having a corner formed by three surfaces of the outer wall;

an inner wall having outer surfaces equivalent or similar to inside surfaces of said outer wall and a corner corresponding to the corner of said outer wall, said inner wall defining a liquid accommodating portion for containing liquid therein, said inner wall further having a liquid supply portion for supplying the liquid out of said liquid accommodating portion;

wherein said inner wall has a thickness which decreases from a central portion of surfaces thereof to the corner, and said outer wall and said inner wall are separable from each other;

said manufacturing method further comprising:

reducing pressure of the liquid accommodating portion to separate the inner wall and the outer wall from each other; and supplying the liquid into the liquid accommodating portion.

9. A method according to claim 8, further comprising pressuring the liquid accommodating portion.

10. A manufacturing method for a liquid container capable of providing a negative pressure, wherein said liquid container includes:

an outer wall; and an inner wall having an outer surface equivalent to an inside surface of the outer wall and having a liquid accommodating portion capable of containing liquid therein, and a liquid supply portion for supplying the liquid out of the accommodating portion;

wherein said liquid container has a polygonal cross-section having sides and corner portions, said method comprising the steps of:

providing a mold corresponding to an outer shape of the liquid container;

providing a substantially cylindrical shaped first parison for the outer wall, said first parison having a diameter smaller than that of the mold;

providing a substantially cylindrical shaped second parison for the inner wall;

expanding the first and second parisons by injecting air so that a thickness of the inner wall in a corner portion is smaller than that in a central portion of each side, so that the first parison extends along the mold, so that the inner wall and the outer wall are separable from each other except in at least one portion where the inner wall and the outer wall are integrated, and so that a space defined by the inner wall and a space defined by the outer wall are similar in configuration to each other; and forming a liquid supply portion in said one portion where said inner wall and said outer wall are integral.

11. A method according to claim 10, wherein in said expanding step, the inner wall is folded back along the outer wall at an end close to an opening of the outer wall constituting the liquid supply portion.

12. A method according to claim 10, wherein said liquid supply portion is cylindrical.

13. A method according to claim 10, wherein in said expanding step, a liquid accommodating portion side end of the liquid supply portion is provided with a bent portion.

14. A method according to claim 10, further comprising the steps of injecting liquid into said liquid accommodating portion, and providing a liquid discharge permitting member for permitting liquid discharge from the liquid supply portion.

15. A method according to claim 14, further comprising the step of peeling the inner wall from the outer wall by reducing pressure in the liquid accommodating portion, and then said liquid injecting step is carried out.

16. A method according to claim 10, wherein in said parison providing steps, said second parison has a multilayer structure of resin materials.

17. A method according to claim 10, wherein said first and second parisons are of resin materials having different heat contraction rates.

18. A manufacturing method for a liquid container, wherein said liquid container includes:

an outer wall;

an inner wall having an outer surface equivalent to the inside surface of the outer wall and having a liquid accommodating portion capable of containing liquid to be supplied to a liquid ejection head, and a liquid supply portion of supplying the liquid out of the liquid accommodating portion;

wherein said liquid container has a polygonal cross-section having sides and corner portions, said method comprising the steps of:

providing a mold corresponding to an outer shape of the liquid container;

providing a substantially cylindrical shaped first parison for the outer wall, said first parison having a diameter smaller than that of the mold;

providing a substantially cylindrical shaped second parison for the inner wall;

expanding the first and second parisons by injecting air so that a thickness of the inner wall in a corner portion is smaller than that in a central portion of each side, so that the first parison extends along the mold, so that the inner wall and the outer wall are separable from each other, and a space defined by the inner wall and a space defined by the outer wall are similar in configuration to each other;

forming a liquid supply portion; and connecting a valve to the inner wall constituting the liquid supply port.

19. A method according to claim 18, wherein in said expanding step, the liquid supply portion is provided in a lower part of the liquid container.

20. A method according to claim 18, wherein the inner wall is folded back along the outer wall at an end close to an opening of the outer wall constituting the liquid supply portion.

21. A method according to claim 18, further comprising the steps of injecting liquid into said liquid accommodating portion, and providing a liquid discharge permitting member for permitting liquid discharge from the liquid supply portion.

22. A method according to claim 18, wherein in said parison providing steps, said second parison has a multilayer structure of resin materials.

23. A method according to claim 18, wherein said first and second parisons are of resin materials having different heat contraction rates.

* * * * *

UNITED STATES PATENT AND TRADEMARK OFFICE

CERTIFICATE OF CORRECTION

PATENT NO. : 6,440,352 B1
DATED : August 27, 2002
INVENTOR(S) : Toshiaki Sasaki et al.

It is certified that error appears in the above-identified patent and that said Letters Patent is hereby corrected as shown below:

Drawings,
Figure 5, "PRESSARE" should read -- PRESSURE --.

Column 1,
Line 32, "one easy" should read -- easy one --; and
Line 54, "result" should read -- results --.

Column 4,
Lines 17 and 36, "corresponding" should read -- corresponding to --;
Line 46, "said is" should read -- said liquid supply portion is --; and
Line 47, "and said said," should be deleted.

Column 5,
Line 6, "corresponding" should read -- corresponding to --;
Line 16, "said is" should read -- said liquid supply portion is --;
Line 17, "and said said," should be deleted; and
Line 46, "corresponding" should read -- corresponding to --.

Column 7,
Line 23, the second occurrence of "an" should be deleted.

Column 8,
Line 30, "has" should read -- have --.

Column 11,
Line 49, "abut" should read -- about --.

Column 12,
Line 25, the second occurrence of "of" should be deleted.

Column 13,
Line 24, "embodiment" should read -- embodiments --.

Column 15,
Line 48, "kind" should read -- kind of --.

Column 19,
Line 17, "all" should read -- wall --.

UNITED STATES PATENT AND TRADEMARK OFFICE

CERTIFICATE OF CORRECTION

PATENT NO. : 6,440,352 B1 
DATED : August 27, 2002
INVENTOR(S) : Toshiaki Sasaki et al.

It is certified that error appears in the above-identified patent and that said Letters Patent is hereby corrected as shown below:

Column 21,
Line 45, "an" should read -- a --; and
Line 46, both occurrences of "an" should read -- a --.

Column 22,
Line 33, "sufficient1y" should read -- sufficiently --.

Column 23,
Line 63, "by" should read -- be --.

Column 24,
Line 18, "to" should read -- with --.

Column 25,
Line 17, "caping" should read -- capping --;
Line 39, "may" should read -- may be --;
Line 42, the second occurrence of "to" should be deleted; and
Line 57, "shape" should read -- shaped --.

Column 26,
Line 17, "by" should read -- be --;
Line 25, "maintain" should read -- maintained --;
Line 28, "such as" should be deleted;
Line 32, "structure." should be deleted.

Signed and Sealed this

Twenty-fifth Day of February, 2003

JAMES E. ROGAN
*Director of the United States Patent and Trademark Office*